(12) United States Patent
Zhou et al.

(10) Patent No.: US 10,142,224 B2
(45) Date of Patent: Nov. 27, 2018

(54) PATH COMPUTATION METHOD, MESSAGE RESPONDING METHOD, AND RELATED DEVICE

(71) Applicant: Huawei Technologies Co., Ltd., Shenzhen (CN)

(72) Inventors: Hong Zhou, Nanjing (CN); Qin Wu, Nanjing (CN); Feng Li, Nanjing (CN); Yue Yin, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 60 days.

(21) Appl. No.: 15/346,438

(22) Filed: Nov. 8, 2016

(65) Prior Publication Data

US 2017/0054634 A1 Feb. 23, 2017

Related U.S. Application Data

(63) Continuation of application No. PCT/CN2015/076779, filed on Apr. 16, 2015.

(30) Foreign Application Priority Data

May 8, 2014 (CN) .......................... 2014 1 0193827

(51) Int. Cl.
*H04L 12/26* (2006.01)
*H04L 12/725* (2013.01)
(Continued)

(52) U.S. Cl.
CPC .............. *H04L 45/50* (2013.01); *H04L 43/08* (2013.01); *H04L 45/02* (2013.01); *H04L 45/302* (2013.01); *H04L 45/42* (2013.01); *H04L 45/64* (2013.01)

(58) Field of Classification Search
None
See application file for complete search history.

(56) References Cited

U.S. PATENT DOCUMENTS 8,885,463 B1 * 11/2014 Medved ................ H04L 45/50
370/228
9,893,951 B1 * 2/2018 Medved ................ H04L 41/12
(Continued)

FOREIGN PATENT DOCUMENTS

CN 102426579 A 4/2012
CN 1947365 B 6/2012
(Continued)

OTHER PUBLICATIONS

Vasseur et al., "Path Computation Element (PCE) Communication Protocol (PCEP)," Standards Track, RFC 5440, XP15065509, pp. 1-87, Network Working Group (Mar. 2009).
(Continued)

*Primary Examiner* — Saba Tsegaye
(74) *Attorney, Agent, or Firm* — Leydig, Voit & Mayer, Ltd.

(57) ABSTRACT

A path computation method and a related device are disclosed. The method includes: a second network device receives path requirement information and a recomputation condition that are sent by a first network device; the second network device first obtains by means of computation a path meeting a requirement according to the path requirement information, and sends description information of the path meeting the requirement to the first network device; then the second network device constantly determines whether the recomputation condition is met; and when the recomputation condition is met, the second network device performs path recomputation, and sends description information of a path obtained by means of recomputation to the first network device. Therefore sensitivity for triggering path recomputa- (Continued)

tion can be improved and a quantity of communication messages between network devices can be reduced.

15 Claims, 17 Drawing Sheets

(51) Int. Cl.
*H04L 12/723* (2013.01)
*H04L 12/715* (2013.01)
*H04L 12/751* (2013.01)
*H04L 12/717* (2013.01)

(56) References Cited

U.S. PATENT DOCUMENTS

| | | | |
|---|---|---|---|
| 2005/0259664 A1 | 11/2005 | Vasseur et al. | |
| 2007/0217419 A1 | 9/2007 | Vasseur | |
| 2010/0220996 A1* | 9/2010 | Lee | H04J 14/0227 398/25 |
| 2012/0140762 A1* | 6/2012 | Wang | H04L 45/04 370/351 |
| 2013/0007266 A1* | 1/2013 | Jocha | H04L 45/00 709/224 |
| 2013/0010612 A1 | 1/2013 | Lee et al. | |
| 2014/0328587 A1* | 11/2014 | Magri | H04L 45/62 398/26 |
| 2015/0063804 A1 | 3/2015 | Lee et al. | |

FOREIGN PATENT DOCUMENTS

| | | |
|---|---|---|
| CN | 102783066 A | 11/2012 |
| WO | WO 2009013085 A1 | 1/2009 |
| WO | WO 2010097049 A1 | 9/2010 |
| WO | 102055662 A | 5/2011 |
| WO | 103346922 A | 10/2013 |

OTHER PUBLICATIONS

Dhody et al., "Extensions to the Path Computation Element Communication Protocol (PCEP) to compute service aware Label Switched Path (LSP), draft-ietf-pce-pcep-service-aware-04," PCE Working Group, Internet-Draft, Standards Track, XP15097368, pp. 1-18, PCE Working Group (Mar. 3, 2014).

Derakhshan et al., "On Converged Multidomain Management of Connectivity in Heterogeneous Networks," Future Network & MobileSummit 2012 Conference Proceedings, XP32231975, pp. 1-9, Future Network Summit (2012).

Crabbe et al., PCEP Extensions for PCE-initiated LSP Setup in a Stateful PCE Model draft-crabbe-pce-pce-initiated-lsp-03, Internet Draft, Standards Track, pp. 1-15, Network Working Group (Oct. 10, 2013).

Shakir et al., "Performance Engineered LSPs using the Segment Routing Data-Plane draft-shakir-rtgwg-sr-performance-engineered-lsps-00," Internet Draft, Standards Track, pp. 1-24, Routing Working Group (Jul. 15, 2013).

* cited by examiner

PATH COMPUTATION METHOD, MESSAGE RESPONDING METHOD, AND RELATED DEVICE

CROSS-REFERENCE TO RELATED APPLICATIONS

This application is a continuation of International Application No. PCT/CN2015/076779, filed on Apr. 16, 2015, which claims priority to Chinese Patent Application No. 201410193827.9, filed on May 8, 2014. The disclosures of the aforementioned applications are hereby incorporated by reference in their entireties.

TECHNICAL FIELD

The present invention relates to the communication field, and in particular, to a path computation method, a message responding method, and a related device.

BACKGROUND

With continuous expansion of a network scale, a traffic engineering technology emerges. A main objective of traffic engineering is to maximize utilization of network resources and improve network performance while ensuring efficiency and reliability of a network operation. Operation costs and expenses of an entire network are reduced by using a bandwidth resource more efficiently. A phenomenon that some links are congested while some links are idle is avoided by allocating traffic properly. Optimization of network resource utilization is implemented and overall performance of a network is improved by planning the traffic properly. In addition to a distributed computation method, such as a Multiprotocol Label Switching-Traffic Engineering (MPLS-TE) technology that is used to compute a path, a centralized path computation architecture may also be used to compute a path.

As shown in FIG. 1, a centralized path computation system includes two main components: a path computation client (PCC) and a path computation element (PCE). Message interaction is performed between the path computation client and the path computation element by using a Path Computation Element Communication Protocol (PCEP). Specifically, the path computation element may further include a traffic engineering database and a policy module. The traffic engineering database includes information such as a topology of a network, link bandwidth, a delay, and a packet loss. The policy module can configure a path computation policy.

As shown in FIG. 2, if a path computation client wants to perform path computation, the path computation client sends a path computation request PCReq message to a path computation element, where the message includes information such as source and destination identifiers of a path and required bandwidth. After receiving the PCReq message, the path computation element computes a path according to a requirement in the message. If a path meeting the requirement is found by means of computation, a path computation response PCRep success message is returned; or if the path meeting the requirement cannot be found, a PCRep failure message is returned.

Because path flapping may exist (for example, a device on the path fails), after receiving the successful path information, the path computation client needs to know whether the path is still normal. As shown in FIG. 3, after receiving a successful PCRep message, the path computation client starts a timer. Once the timer expires, the path computation client sends a PCReq path recomputation message to the path computation element, where the message carries original path information. After receiving the PCReq message, the path computation element performs the path computation again. In this way, the path computation client can know whether the path is still normal.

However, in actual application, timed recomputation only adapts to a scenario in which only bandwidth is considered, such as a scenario in which bandwidth is reserved based on a Resource ReSerVation Protocol (RSVP). In some other scenarios in which not only bandwidth is considered, but also network performance parameters such as a packet loss, a delay, and jitter need to be considered, for example, in an intelligent routing network system, parameters such as a packet loss and a delay dynamically change in a network. If an expiration time of a recomputation timer of the path computation client is set to be extremely long, changes of the packet loss and the delay may be missed, and consequently a path cannot be adjusted in a timely manner; if the expiration time of the timer is set to be extremely short, a quantity of communication messages between the path computation client and the path computation element is increased, and communication burden of the path computation client and the path computation element is increased.

SUMMARY

Embodiments of the present invention provide a path computation method, a message responding method, and a related device, which are used to improve sensitivity for triggering path recomputation and reduce a quantity of communication messages between network devices.

A first aspect of the embodiments of the present invention provides a path computation method, including:

receiving, by a second network device, path requirement information and a recomputation condition that are sent by a first network device;

computing, by the second network device, a path meeting a requirement according to the path requirement information;

sending, by the second network device, first description information to the first network device, where the first description information is description information of the path meeting the requirement;

determining, by the second network device, whether the recomputation condition is met;

performing, by the second network device, path recomputation when the recomputation condition is met; and sending, by the second network device, second description information to the first network device, where the second description information is description information of a path obtained by means of recomputation.

With reference to the first aspect of the embodiments of the present invention, in a first implementation manner of the first aspect of the embodiments of the present invention, the determining, by the second network device, whether the recomputation condition is met includes:

obtaining, by the second network device, a current network performance parameter change rate on the path meeting the requirement;

determining, by the second network device, whether a preset recomputation time interval is reached or whether the current network performance parameter change rate exceeds a preset network performance parameter change range; and determining that the recomputation condition is met if the preset recomputation time interval is reached or the preset network performance parameter change range is exceeded; or determining that the recomputation condition is not met if the preset recomputation time interval is not reached and the preset network performance parameter change range is not exceeded.

With reference to the first implementation manner of the first aspect of the embodiments of the present invention, in a second implementation manner of the first aspect of the embodiments of the present invention, the obtaining, by the second network device, a current network performance parameter change rate on the path meeting the requirement specifically includes:

querying, by the second network device, a network information database to obtain a network performance parameter on the path meeting the requirement, where the network information database includes status information of a network, the status information includes the network performance parameter, and the status information is stored in the network information database after being measured and collected by a network measurement unit; and obtaining, by the second network device by means of computation, the current network performance parameter change rate on the path meeting the requirement according to the network performance parameter.

With reference to any implementation manner of the first aspect to the second implementation manner of the first aspect of the embodiments of the present invention, in a third implementation manner of the first aspect of the embodiments of the present invention, both the first network device and the second network device are located on an overlay network.

With reference to the third implementation manner of the first aspect of the embodiments of the present invention, in a fourth implementation manner of the first aspect of the embodiments of the present invention, the first network device is a path computation client PCC; and the second network device is a path computation element PCE.

A second aspect of the embodiments of the present invention provides a message responding method, including:

receiving, by a second network device, a progress request message sent by a first network device, where the progress request message includes a progress request field, and the progress request field is used to request the second network device to report computation progress to the first network device, where the computation progress is progress of performing path computation; and reporting, by the second network device, a progress value to the first network device, where the progress value is used to indicate the computation progress.

With reference to the second aspect of the embodiments of the present invention, in a first implementation manner of the second aspect of the embodiments of the present invention, the progress request message further includes a time interval field for reporting progress and a report manner field, where the time interval field for reporting the progress includes a time interval value for reporting the progress, and the report manner field is used to set a manner in which the second network device reports the computation progress to the first network device; and the reporting, by the second network device, a computation progress value to the first network device includes:

reporting, by the second network device, the computation progress value to the first network device according to the manner in which the computation progress is reported and the time interval value for reporting the progress.

With reference to the second aspect or the first implementation manner of the second aspect of the embodiments of the present invention, in a third implementation manner of the second aspect of the embodiments of the present invention, the first network device is a path computation client PCC; and the second network device is a path computation element PCE.

A third aspect of the embodiments of the present invention provides a network device that is configured as a first network device, where the network device includes:

a first sending module, configured to send path requirement information and a recomputation condition to a second network device, where: the path requirement information is used to enable the second network device to obtain, by means of computation, a path meeting a requirement and return first description information, where the first description information is description information of the path meeting the requirement; and the recomputation condition is used to enable the second network device to perform path recomputation and return second description information when the recomputation condition is met, where the second description information is description information of a path obtained by means of recomputation; and a first receive module, configured to receive the first description information and the second description information that are returned by the second network device.

A fourth aspect of the embodiments of the present invention provides a network device that is configured as a second network device, where the network device includes:

a second receive module, configured to receive path requirement information and a recomputation condition that are sent by a first network device;

an initial computation module, configured to compute a path meeting a requirement according to the path requirement information received by the second receive module;

a second sending module, configured to send first description information to the first network device, where the first description information is description information of the path that meets the requirement and that is obtained by the initial computation module by means of computation;

a determining module, configured to determine whether the recomputation condition received by the second receive module is met;

a recomputation module, configured to perform path recomputation when the determining module determines that the recomputation condition is met; and a third sending module, configured to send second description information to the first network device, where the second description information is description information of a path obtained by the recomputation module by means of recomputation.

With reference to the fourth aspect of the embodiments of the present invention, in a first implementation manner of the fourth aspect of the embodiments of the present invention, the determining module specifically includes:

an obtaining unit, configured to obtain a current network performance parameter change rate on the path that meets the requirement and that is obtained by the initial computation module by means of computation;

a determining unit, configured to: determine whether a preset recomputation time interval is reached or whether the current change rate that is of the network performance parameter and that is obtained by the obtaining unit exceeds a preset network performance parameter change range; and determine that the recomputation condition is met when it is determined that the preset recomputation time interval is reached or the preset network performance parameter change range is exceeded; or determine that the recomputation condition is not met when it is determined that the preset recomputation time interval is not reached and the preset network performance parameter change range is not exceeded.

With reference to the first implementation manner of the fourth aspect of the embodiments of the present invention, in a second implementation manner of the fourth aspect of the embodiments of the present invention, the obtaining unit specifically includes:

a querying subunit, configured to query a network information database to obtain the network performance parameter on the path meeting the requirement, where the network information database includes status information of a network, the status information includes the network performance parameter, and the status information is stored in the network information database after being measured and collected by a network measurement unit; and a computation subunit, configured to obtain, by means of computation, the current network performance parameter change rate on the path meeting the requirement according to the network performance parameter obtained by the querying subunit by means of querying.

A fifth aspect of the embodiments of the present invention provides a network device that is configured as a first network device, where the network device includes:

a fourth sending module, configured to send a progress request message to a second network device, where the progress request message includes a progress request field, and the progress request field is used to request the second network device to report computation progress to the first network device, where the computation progress is progress of performing path computation; and a third receive module, configured to receive a progress value returned by the second network device, where the progress value is used to indicate the computation progress; and a processing module, configured to perform processing according to the progress value received by the third receive module.

With reference to the fifth aspect of the embodiments of the present invention, in a first implementation manner of fifth aspect of the embodiments of the present invention, when the progress request message further includes a time interval field for reporting progress, and the time interval field for reporting the progress includes a time interval value for reporting the progress, the network device further includes:

a setting module, configured to set a timer, where an expiration value of the timer is not less than the time interval value for reporting the progress; and the processing module is specifically configured to: determine whether the progress value received by the third receive module is higher than a preset progress; and reset the timer when it is determined that the progress value is higher than the preset progress; or send a computation cancellation message to the second network device when it is determined that the progress value received by the third receive module is not higher than the preset progress, where the computation cancellation message is used to cancel path computation being performed in the second network device.

A sixth aspect of the embodiments of the present invention provides a network device that is configured as a second network device, where the network device includes:

a fourth receive module, configured to receive a progress request message sent by a first network device, where the progress request message includes a progress request field, and the progress request field is used to request the second network device to report computation progress to the first network device, where the computation progress is progress of performing path computation; and a reporting module, configured to report a progress value to the first network device, where the progress value is used to indicate the computation progress.

With reference to the sixth aspect of the embodiments of the present invention, in a first implementation manner of the sixth aspect of the embodiments of the present invention, when the progress request message further includes a time interval field for reporting progress and a report manner field, where the time interval field for reporting the progress includes a time interval value for reporting the progress, and the report manner field is used to set a manner in which the second network device reports the computation progress to the first network device, the reporting module is specifically configured to report the computation progress value to the first network device according to the manner of reporting the computation progress and the time interval value for reporting the progress.

It may be seen from the foregoing solutions that the embodiments of the present invention have the following advantages: In the embodiments of the present invention, a second network device receives path requirement information and a recomputation condition that are sent by a first network device; the second network device first obtains, by means of computation, a path meeting a requirement according to the path requirement information, and sends description information of the path meeting the requirement to the first network device; then the second network device constantly determines whether the recomputation condition is met; and when the recomputation condition is met, the second network device performs path recomputation, and sends description information of a path obtained by means of recomputation to the first network device. In this way, because the second network device autonomously performs the path recomputation by determining the recomputation condition, the first network device does not need to send, after each timeout, a request to the second network device for performing recomputation, which improves sensitivity for triggering path recomputation and reduces a quantity of communication messages between network devices.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

It should be understood that although terms "first" and "second" are used in the embodiments of the present invention to describe network devices, the network devices are not limited by these terms. These terms are merely used to differentiate the network devices. For example, without departing from the scope of the embodiments of the present invention, a first network device may also be referred to as a second network device, and similarly, the second network device may also be referred to as the first network device; likewise, the second network device may also be referred to as a third network device. No limitation is imposed in the embodiments of the present invention.

The embodiments of the present invention provide a path computation method, a message responding method, and a related device, which are used to improve sensitivity for triggering path recomputation and reduce a quantity of communication messages between network devices.

Figure 1:
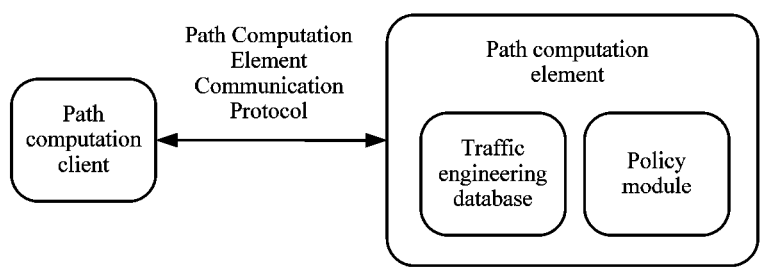
FIG. 1 is a schematic structural diagram of a path computation system in the prior art.
Figure 2:
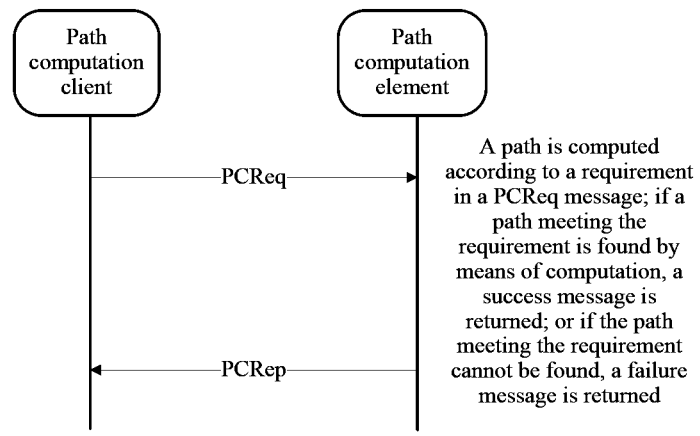
FIG. 2 is a schematic diagram of an example of signaling interaction of a path computation method in the prior art.
Figure 3:
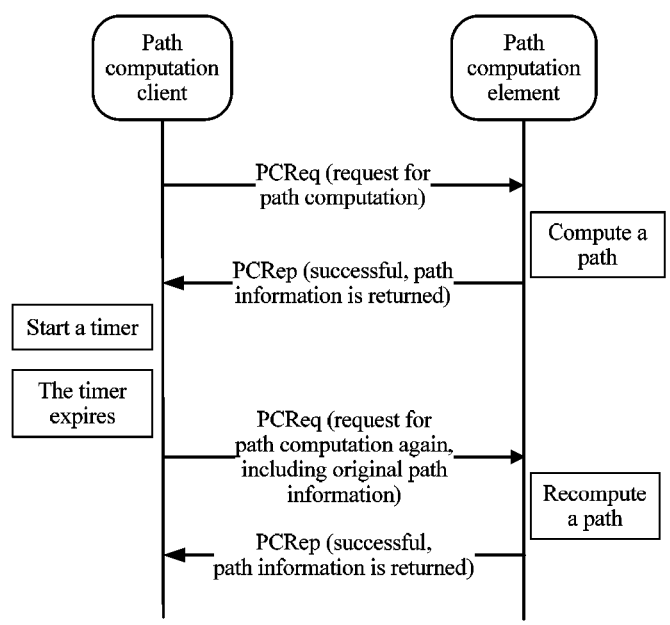
FIG. 3 is a schematic diagram of another example of signaling interaction of a path computation method in the prior art.
Figure 4:
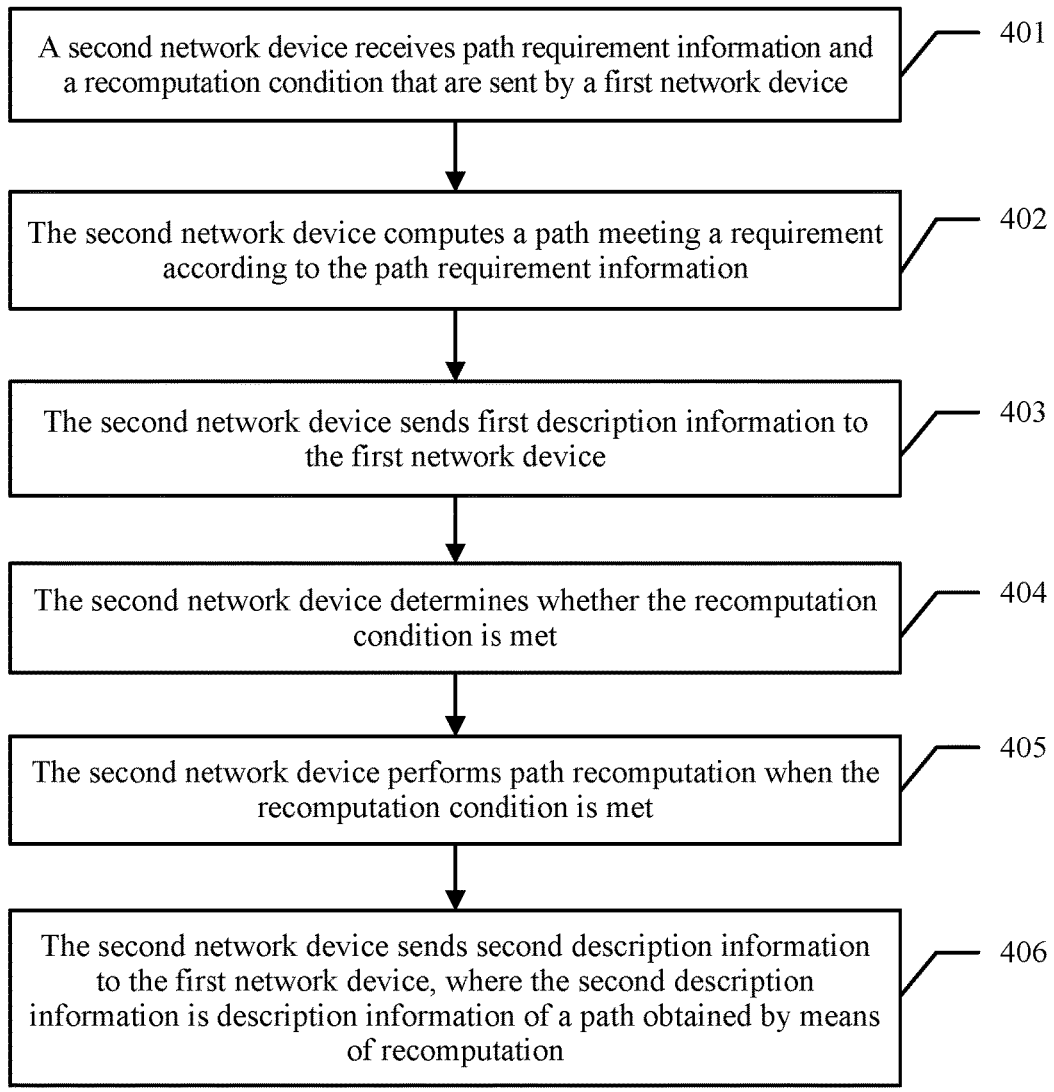
FIG. 4 is a schematic flowchart of a path computation method according to an embodiment of the present invention.

The following describes the path computation method in the embodiments of the present invention respectively from perspectives of two different entities for executing the method:

1. Operations of a Second Network Device:

Referring to FIG. 4, an embodiment of a path computation method in the embodiments of the present invention includes:

401. A second network device receives path requirement information and a recomputation condition that are sent by a first network device.

The second network device receives the path requirement information and the recomputation condition that are sent by the first network device.

The path requirement information includes source and destination identifiers of a path that needs to be computed, and one or more required network performance parameters. The network performance parameters may be a delay, a packet loss, jitter, bandwidth, and the like, which are not limited herein.

It may be understood that the second network device may first receive the path requirement information sent by the first network device, and then receive the recomputation condition sent by the first network device after step 402 and before step 404; or may receive both the path requirement information and the recomputation condition that are sent by the first network device, and then perform subsequent processing. No limitation is imposed herein.

402. The second network device computes a path meeting a requirement according to the path requirement information.

After receiving the path requirement information sent by the first network device, the second network device computes the path meeting the requirement according to the path requirement information.

403. The second network device sends first description information to the first network device.

After obtaining, by means of computation, the path meeting the requirement, the second network device sends the first description information to the first network device, where the first description information is description information of the path meeting the requirement.

404. The second network device determines whether the recomputation condition is met.

After receiving the recomputation condition and obtaining, by means of computation, the path meeting the requirement, the second network device determines whether the recomputation condition is met.

405. The second network device performs path recomputation when the recomputation condition is met.

When determining that the recomputation condition is met, the second network device performs the path recomputation.

It may be understood that performing the path recomputation may be performing path recomputation on the path requirement information, or may be directly performing path recomputation on the path that meets the requirement and that is obtained by means of computation. No limitation is imposed herein.

406. The second network device sends second description information to the first network device, where the second description information is description information of a path obtained by means of recomputation.

After obtaining the path by means of recomputation, the second network device sends the second description information to the first network device, where the second description information is description information of the path obtained by means of recomputation.

In this embodiment of the present invention, a second network device receives path requirement information and a recomputation condition that are sent by a first network device; the second network device first obtains, by means of computation, a path meeting a requirement according to the path requirement information, and sends path description information of the path meeting the requirement to the first network device; then the second network device constantly determines whether the recomputation condition is met; and when the recomputation condition is met, the second network device performs path recomputation, and sends description information of a path obtained by means of recomputation to the first network device. In this way, because the second network device autonomously performs the path recomputation by determining the recomputation condition, the first network device does not need to send, after each timeout, a request to the second network device for performing recomputation, which improves sensitivity for triggering path recomputation and reduces a quantity of communication messages between network devices.

Figure 5:
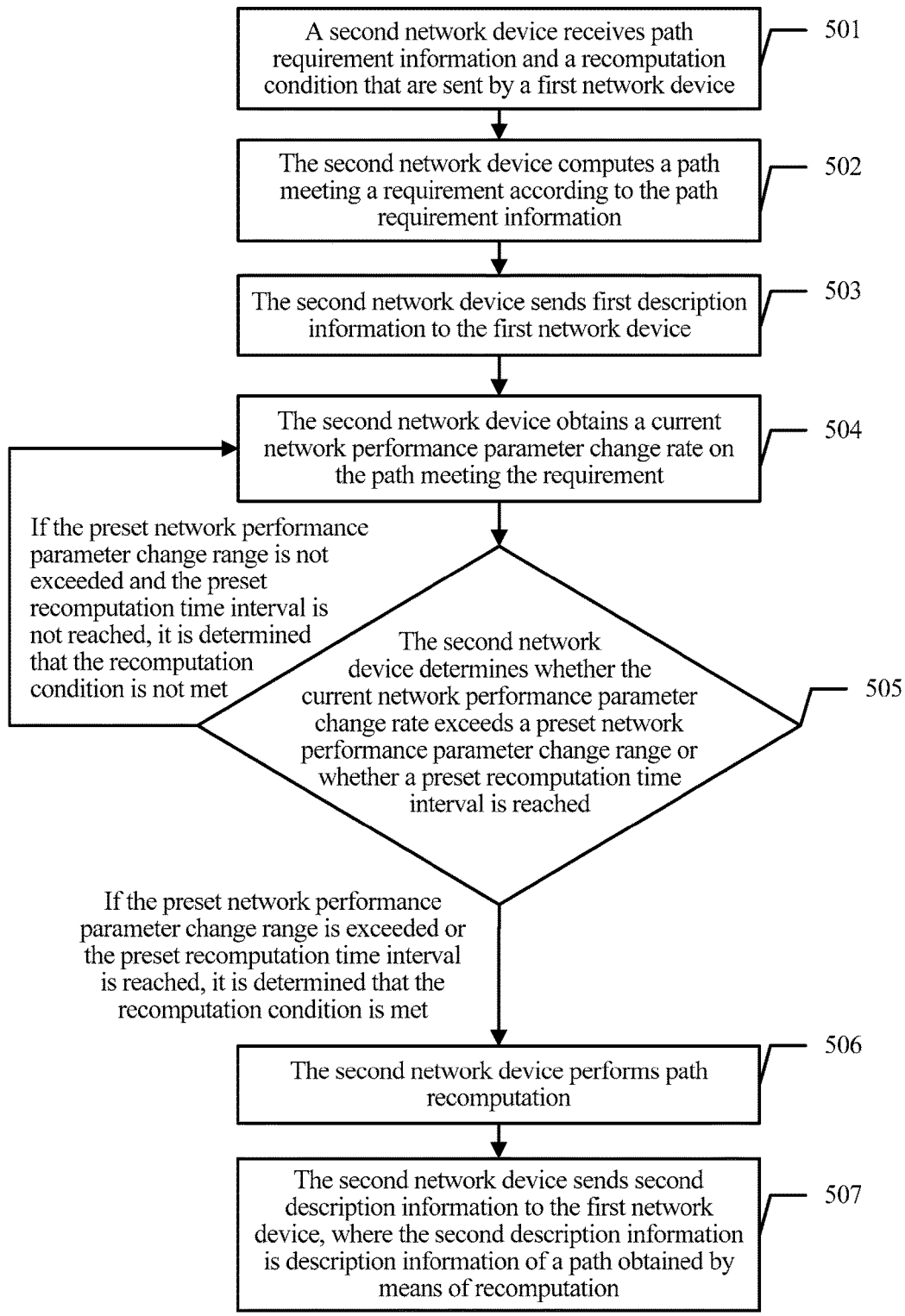
FIG. 5 is a schematic diagram of another example of signaling interaction of a path computation method according to an embodiment of the present invention.

In the foregoing embodiment, the second network device determines whether the recomputation condition is met. In actual application, there may be various recomputation conditions. That is, there are many manners of determining whether the recomputation condition is met; for example, whether the recomputation condition is met may be determined by determining a current network performance parameter change rate. Referring to FIG. 5, another embodiment of a path computation method in the embodiments of the present invention includes:

501. A second network device receives path requirement information and a recomputation condition that are sent by a first network device.

The second network device receives the path requirement information and the recomputation condition that are sent by the first network device.

It may be understood that after the first network device sends a recomputation condition once, the first network device may further send a new recomputation condition again according to an actual requirement. After receiving the new recomputation condition, the second network device may update the recomputation condition.

The path requirement information includes source and destination identifiers of a path that needs to be computed, and one or more required network performance parameters. The network performance parameters may be a delay, a packet loss, jitter, bandwidth, and the like, which are not limited herein.

It may be understood that the second network device may first receive the path requirement information sent by the first network device, and then receive the recomputation condition sent by the first network device after step 502 and before step 504; or may receive both the path requirement information and the recomputation condition that are sent by the first network device, and then perform subsequent processing. No limitation is imposed herein.

502. The second network device computes a path meeting a requirement according to the path requirement information.

After receiving the path requirement information sent by the first network device, the second network device computes the path meeting the requirement according to the path requirement information.

503. The second network device sends first description information to the first network device.

After obtaining, by means of computation, the path meeting the requirement, the second network device sends the first description information to the first network device, where the first description information is description information of the path meeting the requirement.

504. The second network device obtains a current network performance parameter change rate on the path meeting the requirement.

The second network device receives the recomputation condition, where the recomputation condition includes: when a preset network performance parameter change range is exceeded, the second network device obtains the current network performance parameter change rate on the path meeting the requirement.

505. The second network device determines whether the current network performance parameter change rate exceeds a preset network performance parameter change range or whether a preset recomputation time interval is reached.

After obtaining the current network performance parameter change rate, the second network device determines whether the current network performance parameter change rate exceeds the preset network performance parameter change range or whether the preset recomputation time interval is reached.

If the preset network performance parameter change range is exceeded or the preset recomputation time interval is reached, it is determined that the recomputation condition is met, and step 506 is performed; or if the preset network performance parameter change range is not exceeded and the preset recomputation time interval is not reached, it is determined that the recomputation condition is not met, and step 504 may be performed.

It may be understood that, in some scenarios, whether the preset recomputation condition is met may be determined alone by determining whether the preset network performance parameter change range is exceeded or determining whether the preset recomputation time interval is reached, and another recomputation condition may further be set according to different requirements on network path performance. No limitation is imposed herein.

506. The second network device performs path recomputation.

When determining that the recomputation condition is met, the second network device performs the path recomputation.

507. The second network device sends second description information to the first network device, where the second description information is description information of a path obtained by means of recomputation.

After obtaining the path by means of recomputation, the second network device sends the second description information to the first network device, where the second description information is description information of the path obtained by means of recomputation.

In this embodiment of the present invention, a second network device determines whether a recomputation condition is met by determining whether a current network performance parameter change rate exceeds a preset network performance parameter change range or whether a preset recomputation time interval is exceeded, so that path recomputation is triggered more accurately.

Figure 6:
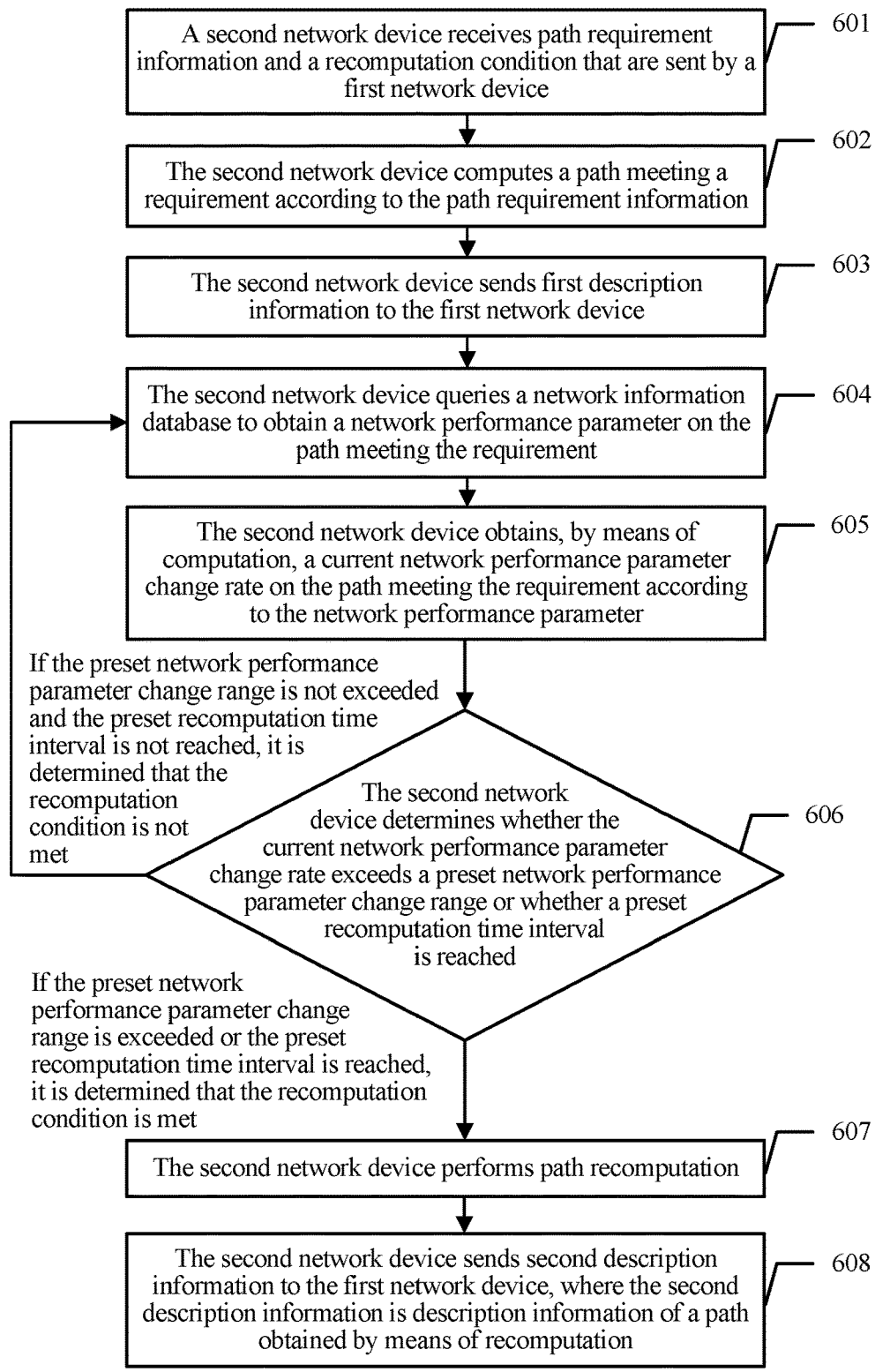
FIG. 6 is a schematic diagram of another example of signaling interaction of a path computation method according to an embodiment of the present invention.

In the foregoing embodiment, the second network device obtains a current network performance parameter change rate on a path meeting a requirement. In actual application, the second network device may first query a network information database to obtain a network performance parameter on the path meeting the requirement, and then obtain the current network performance parameter change rate by means of computation. Referring to FIG. 6, another embodiment of a path computation method in the embodiments of the present invention includes:

601. A second network device receives path requirement information and a recomputation condition that are sent by a first network device.

The second network device receives the path requirement information and the recomputation condition that are sent by the first network device.

The path requirement information includes source and destination identifiers of a path that needs to be computed, and one or more required network performance parameters. The network performance parameters may be a delay, a packet loss, jitter, bandwidth, and the like, which are not limited herein.

It may be understood that the first network device and the second network device may be located on a common home network, or may be located on an overlay (Overlay) network. No limitation is imposed herein.

In some actual application scenarios, the first network device may be a path computation client PCC, and the second network device may be a path computation element PCE; it may be understood that the first network device and the second network device may further be other network devices that implement steps described in the embodiments of the present invention. No limitation is imposed herein.

It may be understood that the second network device may first receive the path requirement information sent by the first network device, and then receive the recomputation condition sent by the first network device after step 602 and before step 604; or may receive both the path requirement information and the recomputation condition that are sent by the first network device, and then perform subsequent processing. No limitation is imposed herein.

602. The second network device computes a path meeting a requirement according to the path requirement information.

After receiving the path requirement information sent by the first network device, the second network device computes the path meeting the requirement according to the path requirement information.

603. The second network device sends first description information to the first network device.

After obtaining, by means of computation, the path meeting the requirement, the second network device sends the first description information to the first network device, where the first description information is description information of the path meeting the requirement.

604. The second network device queries a network information database to obtain a network performance parameter on the path meeting the requirement.

The second network device receives the recomputation condition, where the recomputation condition includes: when a preset network performance parameter change range is exceeded, the second network device may query the network information database to obtain the network performance parameter on the path meeting the requirement, where the network information database includes status information of a network, the status information includes a network performance parameter, and the status information is stored in the network information database after being measured and collected by a network measurement unit.

605. The second network device obtains, by means of computation, the current network performance parameter change rate on the path meeting the requirement according to the network performance parameter.

After obtaining, by means of querying, the network performance parameter on the path meeting the requirement, the second network device obtains, by means of computation, the current network performance parameter change rate on the path meeting the requirement according to the network performance parameter.

606. The second network device determines whether the current network performance parameter change rate exceeds a preset network performance parameter change range or whether a preset recomputation time interval is reached.

After obtaining the current network performance parameter change rate, the second network device determines whether the current network performance parameter change rate exceeds the preset network performance parameter change range or whether the preset recomputation time interval is reached.

If the preset network performance parameter change range is exceeded or the preset recomputation time interval is reached, it is determined that the recomputation condition is met, and step 607 is performed; or if the preset network performance parameter change range is not exceeded and the preset recomputation time interval is not reached, it is determined that the recomputation condition is not met, and step 604 may be performed.

It may be understood that another recomputation condition may further be set according to different requirements on network path performance. No limitation is imposed herein.

607. The second network device performs path recomputation.

When determining that the recomputation condition is met, the second network device performs the path recomputation.

608. The second network device sends second description information to the first network device, where the second description information is description information of a path obtained by means of recomputation.

After obtaining the path by means of recomputation, the second network device sends the second description information to the first network device, where the second description information is description information of the path obtained by means of recomputation.

In this embodiment of the present invention, a second network device queries a network information database to obtain a network performance parameter on a path meeting a requirement, and then obtains a current network performance parameter change rate by means of computation, so that an obtained network performance parameter change rate is more accurate, and accuracy of path recomputation triggering is further improved.

2. Operations of a First Network Device:

Another embodiment of a path computation method in the embodiments of the present invention includes:

A first network device sends path requirement information and a recomputation condition to a second network device.

When a network path needs to be computed, the first network device sends the path requirement information and the recomputation condition to the second network device, where: the path requirement information is used to enable the second network device to obtain, by means of computation, a path meeting a requirement and return first description information, where the first description information is description information of the path meeting the requirement; and the recomputation condition is used to enable the second network device to perform path recomputation and return second description information when the recomputation condition is met, where the second description information is description information of a path obtained by means of recomputation.

It may be understood that multiple occasions may be selected for the first network device to send the path requirement information and the recomputation condition to the second network device. For example, the first network device may send both the path requirement information and the recomputation condition to the second network device when path computation needs to be performed; or may send the path requirement information alone when the path computation needs to be performed, and then send the recomputation condition to the second network device after the second network device returns the description information of the path meeting the requirement. No limitation is imposed herein.

The description information of the path may include a path identifier, or description information of each network node on the path, such as an identifier or an IP address of each network node. No limitation is imposed herein.

The path requirement information includes source and destination identifiers of a path that needs to be computed, and one or more required network performance parameters. The network performance parameters may be a delay, a packet loss, jitter, bandwidth, and the like, which are not limited herein.

It may be understood that the recomputation condition may vary according to different network path performance required by the first network device, and there may further be different recomputation conditions according to an actual situation. For example, the recomputation condition may be that a current network performance parameter change rate on the path meeting the requirement exceeds a preset network performance parameter change range, or may be that a preset recomputation time interval is reached, and may further be a combination thereof or any condition of combination conditions. No limitation is imposed herein.

In this embodiment of the present invention, a first network device sends path requirement information and a recomputation condition to a second network device, where the recomputation condition is used to enable the second network device to perform path recomputation and return description information of a path obtained by means of recomputation to the first network device when the recomputation condition is met. In this way, because the second network device autonomously performs the path recomputation by determining the recomputation condition, the first network device does not need to send, after each timeout, a request to the second network device for performing recomputation, which improves sensitivity for triggering path recomputation and reduces a quantity of communication messages between network devices.

In actual application, the first network device may be a path computation client PCC, and the second network device may be a path computation element PCE; or the first network device and the second network device may be other network devices that can perform the foregoing steps. No limitation is imposed herein.

The path requirement information and the recomputation condition may be included in an existing message format, for example, the path requirement information and the recomputation condition may be included in a path computation request PCReq message; and likewise, first description information and second description information returned may be included in path computation response PCRep message. Certainly, another message may also be sent to include the path requirement information, the recomputation condition, the first description information, and the second description information. No limitation is imposed herein.

In this embodiment of the present invention, a first network device sends path requirement information and a recomputation condition to a second network device, where the recomputation condition is used to enable the second network device to perform path recomputation and return description information of a path obtained by means of recomputation to the first network device when a preset recomputation condition is met. In this way, because the second network device autonomously performs the path recomputation by determining the recomputation condition, the first network device does not need to send, after each timeout, a request to the second network device for performing recomputation, which improves sensitivity for triggering path recomputation and reduces a quantity of communication messages between network devices.

To facilitate understanding, the following specifically describes a method for computing a path in the embodiments of the present invention with reference to operations of two entities for executing the method in a specific application scenario.

A first network device is a path computation client PCC, a second network device is a path computation element PCE, and a recomputation condition is that a change range of a packet loss/delay is exceeded.

Figure 7:
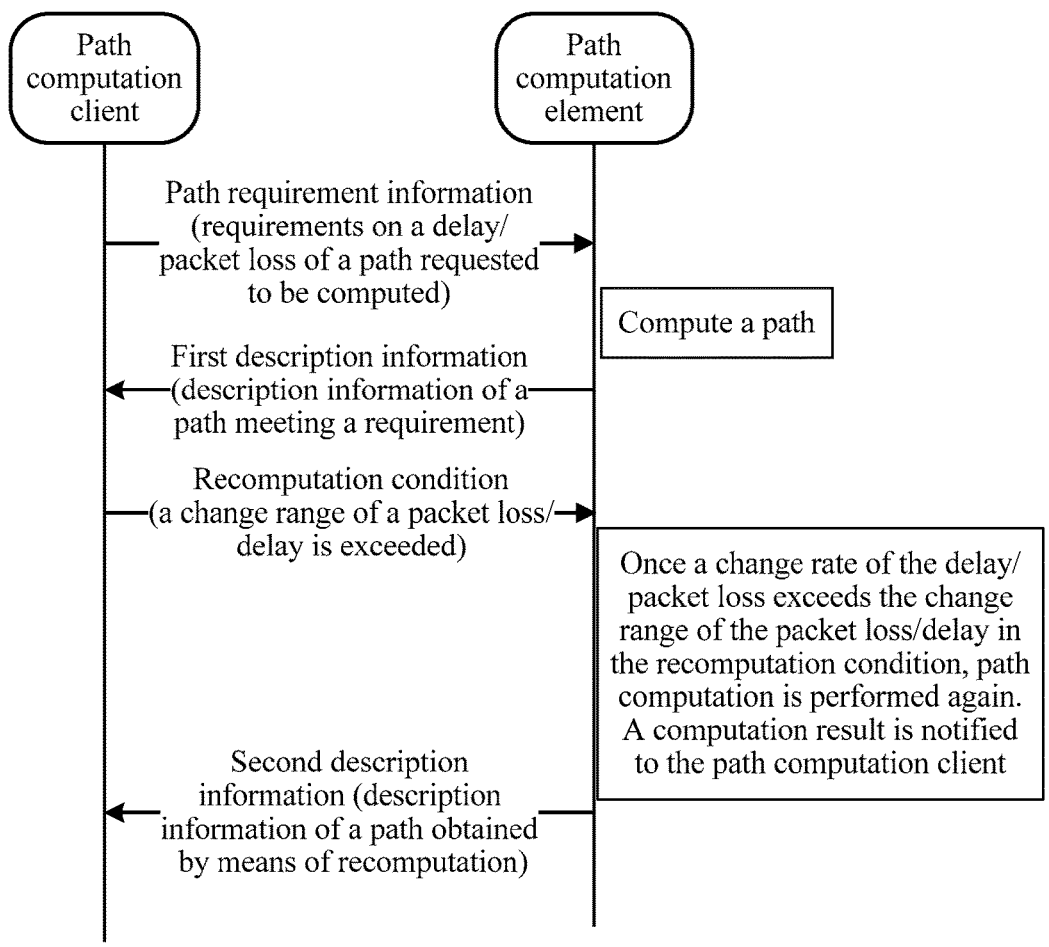
FIG. 7 is a schematic diagram of an example of signaling interaction of a path computation method according to an embodiment of the present invention.

As shown in FIG. 7, a PCC sends path requirement information to a PCE, where the path requirement information includes requirements on a delay and a packet loss of a path requested to be computed;

the PCE computes a path according to the path requirement information, and returns first description information, where the first description information includes description information of a path that meets a requirement and that is obtained by means of computation;

after receiving the description information of the path that meets the requirement and that is obtained by means of computation, the PCC sends a recomputation condition to the PCE, which is that the change range of the packet loss/delay is exceeded;

after the PCE receives the recomputation condition, if a change rate (for example, 10%) of a delay/packet loss on the path meeting the requirement exceeds a change range (for example, 15%) of a packet loss/delay in the recomputation condition, path computation is performed again, and a computation result is notified to the PCC; and the PCE sends second description information to the PCC, where the second description information includes description information of a path obtained by means of recomputation;

The recomputation condition may further include a preset recomputation time interval.

Figure 8:
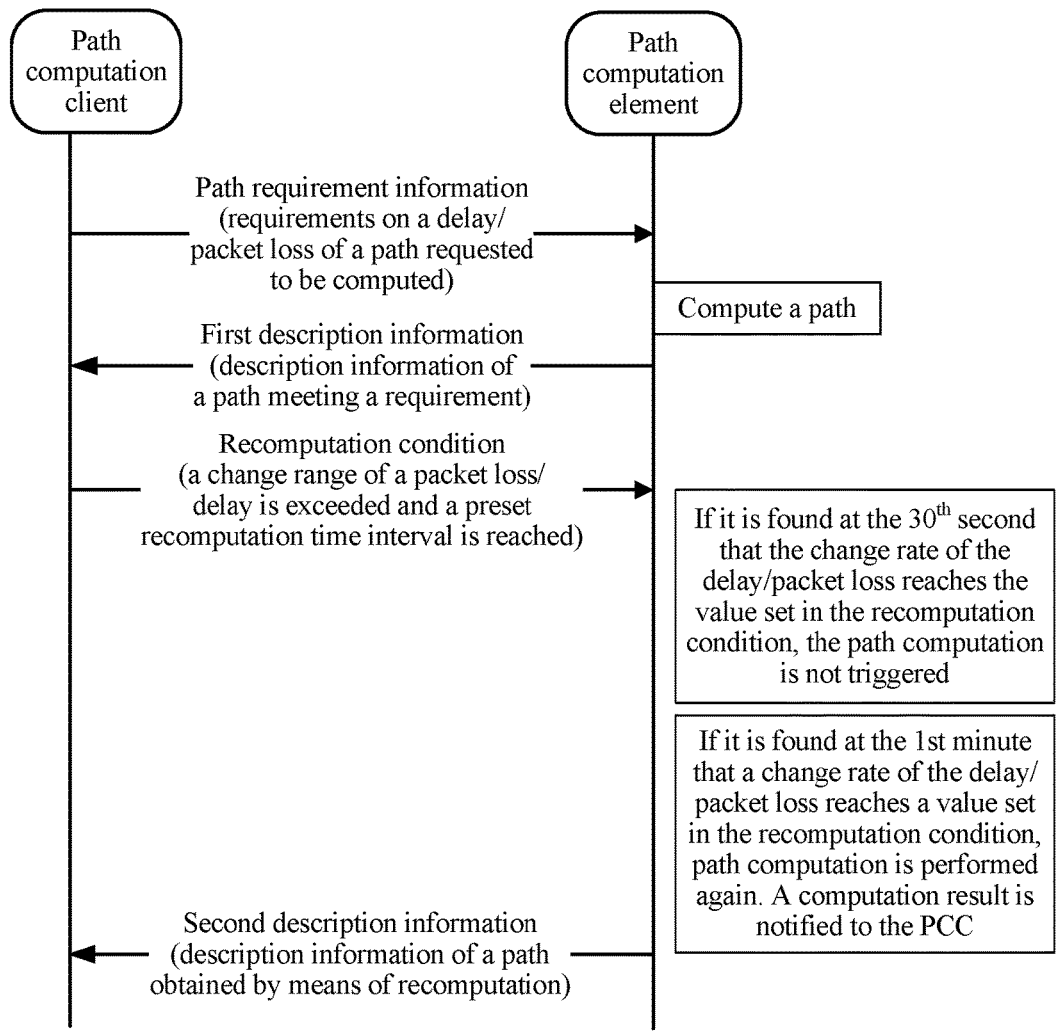
FIG. 8 is a schematic diagram of another example of signaling interaction of a path computation method according to an embodiment of the present invention.

As shown in FIG. 8, a PCC sends path requirement information to a PCE, where the path requirement information includes requirements on a delay and a packet loss of a path requested to be computed;

the PCE computes a path according to the path requirement information, and returns first description information, where the first description information includes description information of a path that meets a requirement and that is obtained by means of computation;

after receiving the description information of the path that meets the requirement and that is obtained by means of computation, the PCC sends a recomputation condition to the PCE. The recomputation condition is that the change range of the packet loss/delay is exceeded and a preset recomputation time interval is reached, for example, the recomputation time interval is one minute;

after the PCE receives the recomputation condition, if it is detected at the $30^{th}$ second that a change rate (for example, 10%) of a delay/packet loss on the path meeting the requirement exceeds a change range (for example, 15%) of a packet loss/delay in the recomputation condition, recomputation is not triggered;

when one minute is reached, if it is detected that the change rate (for example, 10%) of the delay/packet loss on the path meeting the requirement exceeds the change range (for example, 15%) of the packet loss/delay in the recomputation condition, the PCE performs path computation again, and notifies the PCC of a computation result; and the PCE sends the second description information to the PCC, where the second description information includes description information of a path obtained by means of recomputation.

It should be noted that different triggering conditions are merely conditions for triggering recomputation, and that the recomputation condition is met may be that one or more triggering conditions are met, and each condition may further be given a priority or a weight. No limitation is imposed herein.

It may be understood that the first network device and the second network device may be applied to various networks. The following specifically describes a path computation method in the embodiments of the present invention with reference to operations of two entities for executing the method in a scenario in which the two entities for executing the method are used in an overlay network.

Figure 9:
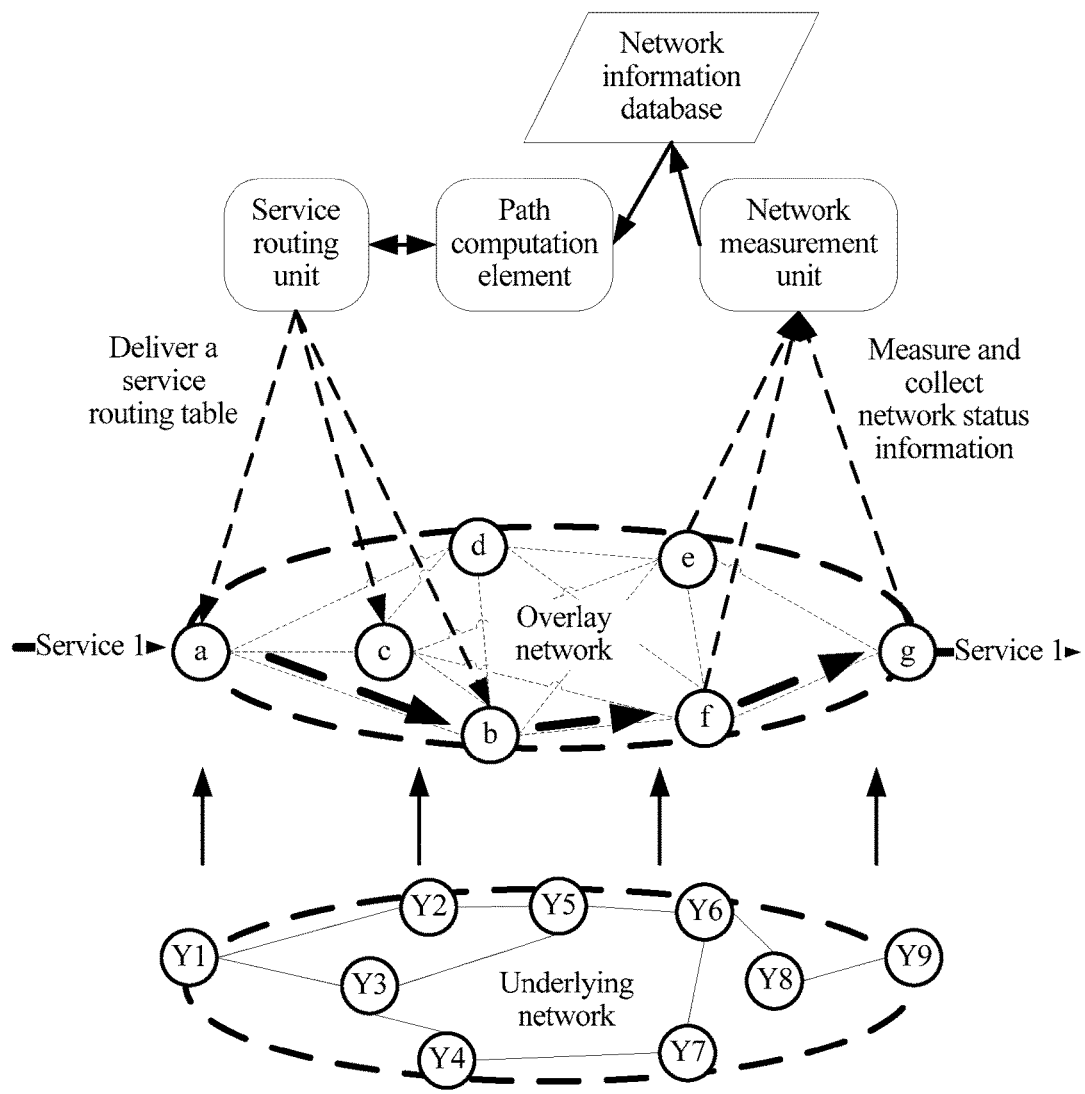
FIG. 9 is a schematic diagram of an application scenario of a path computation method according to an embodiment of the present invention.

As shown in FIG. 9, a first network device is a service routing unit, and a second network device is a path computation element. Network nodes Y1, Y2, Y3, Y4, Y5, Y6, Y7, Y8, and Y9 are network nodes that are located on an underlying network, which may be a router, a switch, a gateway, or another network device. Network nodes a, b, c, d, e, f, and g are network nodes on an overlay network, which are established by clinging to the underlying network. A network node on the overlay network may be a server, or a service card on a router or a switch, or the like.

A network measurement unit is configured to measure and collect status information of the overlay network, where the status information may include network information such as an operating status of the nodes (whether the nodes are normal, and usage of a CPU, memory, a magnetic disk, and the like), a connection status between the nodes, and a delay, a packet loss, jitter, and bandwidth between the nodes. The network measurement unit stores the information to a network information database. In addition to information about the overlay network, the network information database may further store information about the underlying network. The information about the underlying network may include: topology information, routing information, link information, and the like of the underlying network, which may be obtained from a network management system or a network operations system.

The service routing unit selects, according to a feature of a service, a proper overlay network path to forward a service (for example, service 1). When being reflected in a network, the feature of the service may be requirements on a delay, a packet loss, jitter, bandwidth, and the like.

The service routing unit sends these requirements to the path computation element to request the path computation element to obtain, by means of computation, an overlay network path meeting a requirement; and the path computation element queries information in the network information database, performs path computation, and then notifies the service routing unit of a computation result.

The service 1 is required to be transmitted from the node a to the node g, and it is also required that a delay is less than 30 milliseconds. The service routing unit sends these requirements to the path computation element to request path computation;

the path computation element performs path computation and returns a path a-b-f-g meeting the requirement;

the service routing unit sends a message request (that is, a recomputation condition) to the path computation element, and once a delay on the path a-b-f-g exceeds 35 milliseconds, path recomputation is performed; and the path computation element accepts the request and triggers path recomputation when the delay on the path a-b-f-g exceeds 35 milliseconds, and a new path a-c-e-g is returned by the path computation element.

Figure 10:
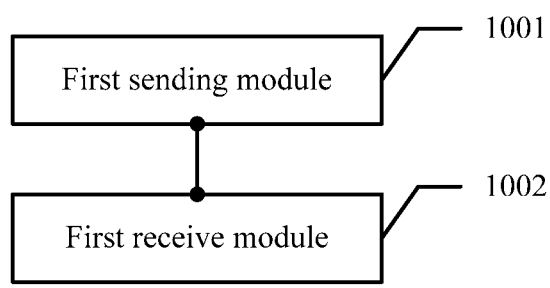
FIG. 10 is a schematic structural diagram of a network device according to an embodiment of the present invention.

The following describes a network device configured as a first network device in an embodiment of the present invention. Referring to FIG. 10, an embodiment of a network device in the embodiments of the present invention includes:

a first sending module 1001, configured to send path requirement information and a recomputation condition to a second network device, where: the path requirement information is used to enable the second network device to obtain, by means of computation, a path meeting a requirement and return first description information, where the first description information is description information of the path meeting the requirement; and the recomputation condition is used to enable the second network device to perform path recomputation and return second description information when the recomputation condition is met, where the second description information is description information of a path obtained by means of recomputation; and a first receive module 1002, configured to receive the first description information and the second description information that are returned by the second network device.

In this embodiment of the present invention, a first sending module 1001 sends path requirement information and a recomputation condition to a second network device, so that when a preset recomputation condition is met, the second network device performs path recomputation again and returns description information of a path obtained by means of recomputation to the first network device. In this way, because the second network device autonomously performs the path recomputation by determining the recomputation condition, the first network device does not need to send, after each timeout, a request to the second network device for performing recomputation, which improves sensitivity for triggering path recomputation and reduces a quantity of communication messages between network devices.

Figure 11:
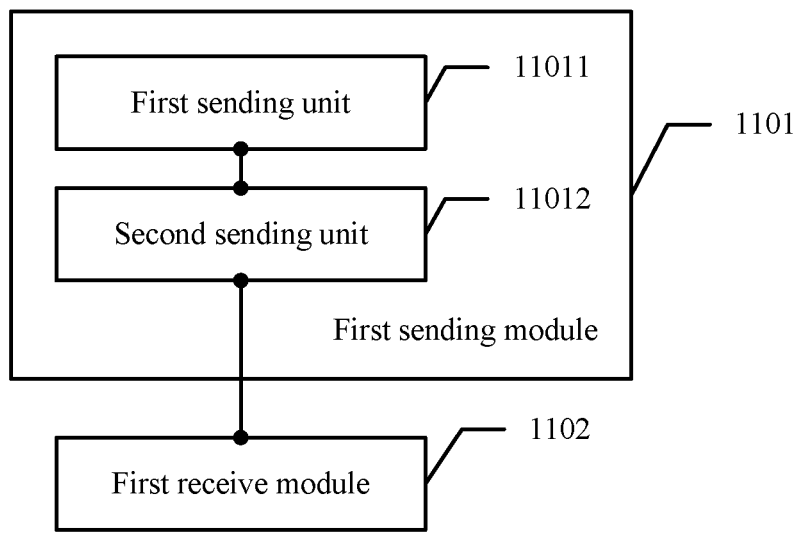
FIG. 11 is another schematic structural diagram of a network device according to an embodiment of the present invention.

In the foregoing embodiment, the first sending module 1001 sends path requirement information and a recomputation condition to a second network device. In actual application, multiple occasions may be selected for the first sending module 1001 to send the path requirement information and the recomputation condition to the second network device. For example, the first sending module 1001 may send both the path requirement information and the recomputation condition to the second network device when path computation needs to be performed; or may send the path requirement information alone when the path computation needs to be performed, and then send the recomputation condition to the second network device after the second network device returns description information of a path meeting the requirement. No limitation is imposed herein. Referring to FIG. 11, another embodiment of a network device in the embodiments of the present invention includes:

a first sending module 1101, configured to send path requirement information and a recomputation condition to a second network device, where: the path requirement information is used to enable the second network device to obtain, by means of computation, a path meeting a requirement and return first description information, where the first description information is description information of the path meeting the requirement; and the recomputation condition is used to enable the second network device to perform path recomputation and return second description information when the recomputation condition is met, where the second description information is description information of a path obtained by means of recomputation; and a first receive module 1102, configured to receive the first description information and the second description information that are returned by the second network device.

In this embodiment, the first sending module 1101 specifically includes:

a first sending unit 11011, configured to send the path requirement information to the second network device; and a second sending unit 11012, configured to send the recomputation condition to the second network device when the first receive module 1102 receives the first description information returned by the second network device.

In this embodiment of the present invention, a first sending unit 11011 first sends path requirement information to a second network device, and after a first receive module 1102 receives first description information returned by the second network device, a second sending unit 11012 sends a recomputation condition to the second network device. In this way, a first network device may determine different recomputation conditions according to different conditions of a path meeting a requirement, so that a finally obtained path can better meet a high requirement of the first network device.

Figure 12:
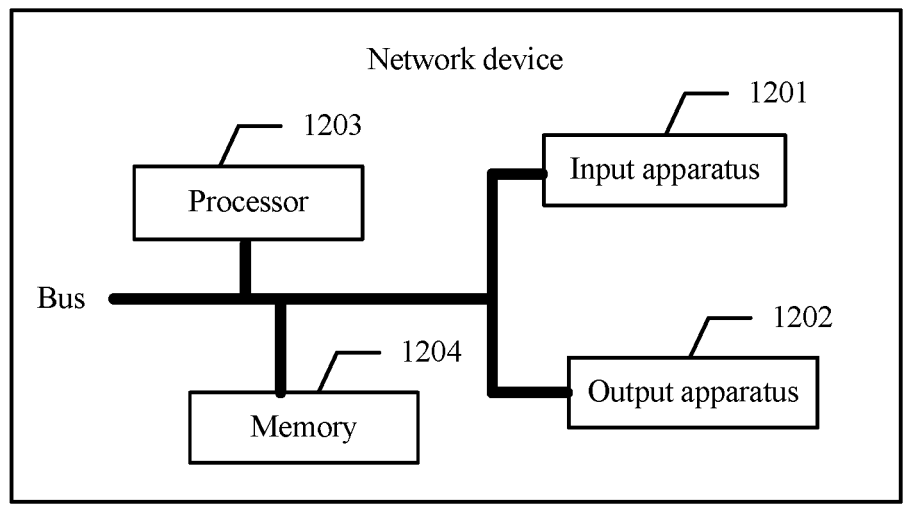
FIG. 12 is another schematic structural diagram of a network device according to an embodiment of the present invention.

The foregoing has described the network device configured as the first network device in this embodiment of the present invention from a perspective of a unitized function entity. The following describes the network device configured as the first network device in this embodiment of the present invention from a perspective of hardware processing. FIG. 12 is a schematic structural diagram of a network device, where the network device may represent a network device configured as a first network device, or may represent a network device configured as a second network device. In this embodiment, the network device a network device configured as a first network device. Referring to FIG. 12, another embodiment of a network device in the embodiments of the present invention includes:

an input apparatus 1201, an output apparatus 1202, a processor 1203, and a memory 1204 (a quantity of processors 1203 in a network device 1200 may be one or more; in FIG. 12, one processor 1203 is used as an example). In some embodiments of the present invention, the input apparatus 1201, the output apparatus 1202, the processor 1203, and the memory 1204 may be connected by using a bus or by another means. In FIG. 12, a bus connection is used as an example, where:

by invoking an operation instruction stored in the memory 1204, the processor 1203 is configured to perform the following steps:

send path requirement information and a recomputation condition to a second network device, where: the path requirement information is used to enable the second network device to obtain, by means of computation, a path meeting a requirement and return first description information, where the first description information is description information of the path meeting the requirement; and the recomputation condition is used to enable the second network device to perform path recomputation and return second description information when the recomputation condition is met, where the second description information is description information of a path obtained by means of recomputation; and receive the first description information and the second description information that are returned by the second network device.

In some embodiments of the present invention, the processor 1203 is specifically configured to perform the following steps:

send the path requirement information to the second network device; and send the recomputation condition to the second network device after receiving the first description information returned by the second network device.

Figure 13:
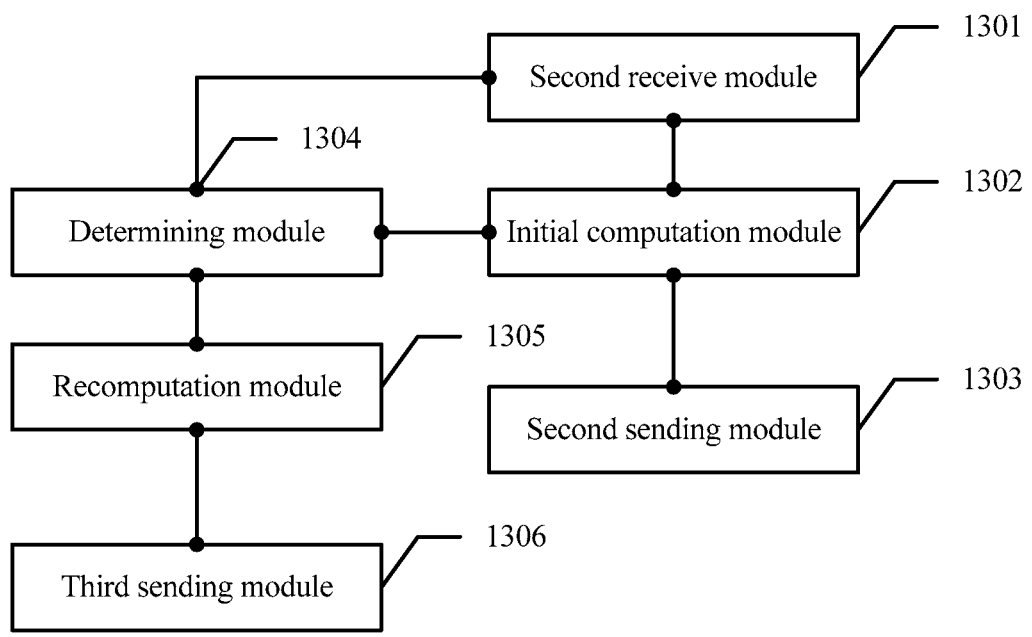
FIG. 13 is another schematic structural diagram of a network device according to an embodiment of the present invention.

The following describes a network device configured as a second network device in the embodiments of the present invention. Referring to FIG. 13, another embodiment of a network device in the embodiments of the present invention includes:

a second receive module 1301, configured to receive path requirement information and a recomputation condition that are sent by a first network device;

an initial computation module 1302, configured to compute a path meeting a requirement according to the path requirement information received by the second receive module 1301;

a second sending module 1303, configured to send first description information to the first network device, where the first description information is description information of the path that meets the requirement and that is obtained by the initial computation module 1302 by means of computation;

a determining module 1304, configured to determine whether the recomputation condition received by the second receive module 1301 is met;

a recomputation module 1305, configured to perform path recomputation when the determining module 1304 determines that the recomputation condition is met; and a third sending module 1306, configured to send second description information to the first network device, where the second description information is description information of a path obtained by the recomputation module by means of recomputation.

In this embodiment of the present invention, a second receive module 1301 receives path requirement information and a recomputation condition that are sent by a first network device; an initial computation module 1302 first obtains, by means of computation, a path meeting a requirement according to the path requirement information, and a second sending module 1303 sends description information of the path meeting the requirement to the first network device; then a determining module 1304 constantly determines whether the recomputation condition is met; and when the recomputation condition is met, a recomputation module 1305 performs path recomputation, and a third sending module 1306 sends description information of a path obtained by means of recomputation to the first network device. In this way, because the second network device autonomously performs the path recomputation by determining the recomputation condition, the first network device does not need to send, after each timeout, a request to the second network device for performing recomputation, which improves sensitivity for triggering path recomputation and reduces a quantity of communication messages between network devices.

Figure 14:
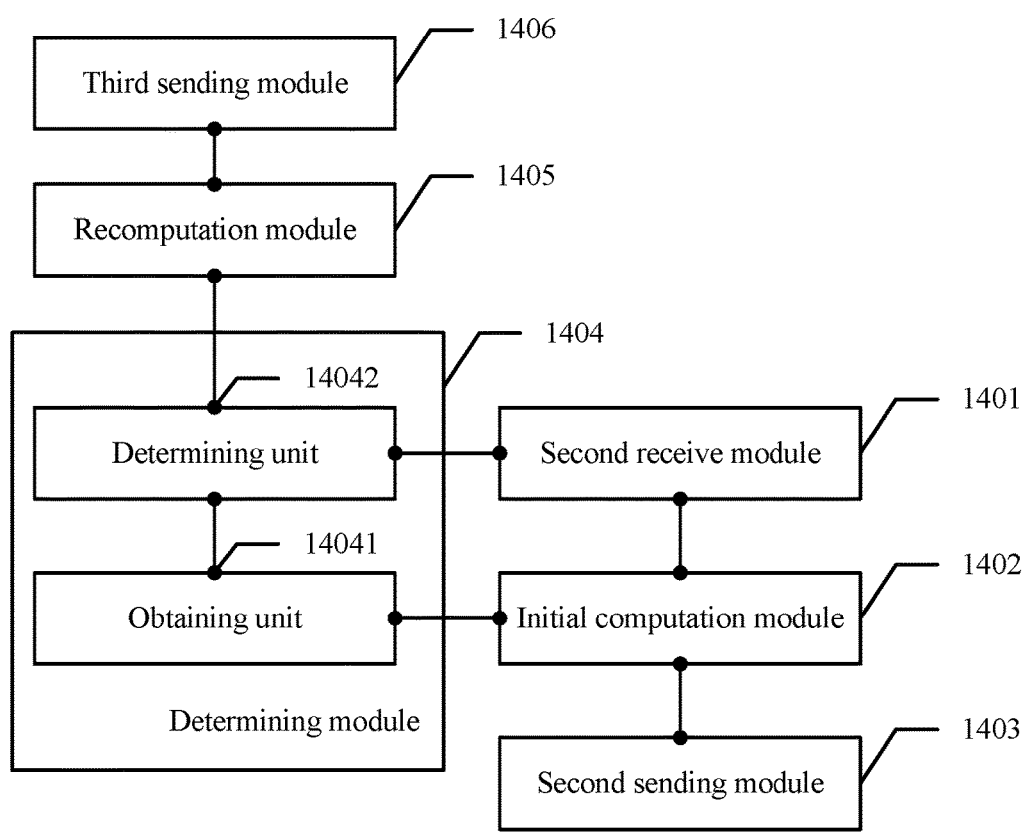
FIG. 14 is another schematic structural diagram of a network device according to an embodiment of the present invention.

In the foregoing embodiment, the determining module 1304 determines whether a recomputation condition is met. In actual application, there may be various recomputation conditions. That is, there are many manners of determining whether the recomputation condition is met; for example, whether the recomputation condition is met may be determined by determining a current network performance parameter change rate. Referring to FIG. 14, another embodiment of a network device in the embodiments of the present invention includes:

a second receive module 1401, configured to receive path requirement information and a recomputation condition that are sent by a first network device;

an initial computation module 1402, configured to compute a path meeting a requirement according to the path requirement information received by the second receive module 1401;

a second sending module 1403, configured to send first description information to the first network device, where the first description information is description information of the path that meets the requirement and that is obtained by the initial computation module 1402 by means of computation;

a determining module 1404, configured to determine whether the recomputation condition received by the second receive module 1401 is met;

a recomputation module 1405, configured to perform path recomputation when the determining module 1404 determines that the recomputation condition is met; and a third sending module 1406, configured to send second description information to the first network device, where the second description information is description information of a path obtained by the recomputation module by means of recomputation.

In this embodiment, the determining module 1404 specifically includes:

an obtaining unit 14041, configured to obtain a current network performance parameter change rate on the path that meets the requirement and that is obtained by the initial computation module 1402 by means of computation; and a determining unit 14042, configured to: determine whether the current change rate that is of the network performance parameter and that is obtained by the obtaining unit 14041 exceeds a preset network performance parameter change range or whether a preset recomputation time interval is reached; and determine that the recomputation condition is met when it is determined that the preset network performance parameter change range is exceeded or the preset recomputation time interval is reached; or determine that the recomputation condition is not met when it is determined that the preset network performance parameter change range is not exceeded and the preset recomputation time interval is not reached.

In this embodiment of the present invention, a determining unit 14042 determines whether a recomputation condition is met by determining whether a current network performance parameter change rate exceeds a preset network performance parameter change range or whether a preset recomputation time interval is exceeded, so that path recomputation is triggered more accurately.

Figure 15:
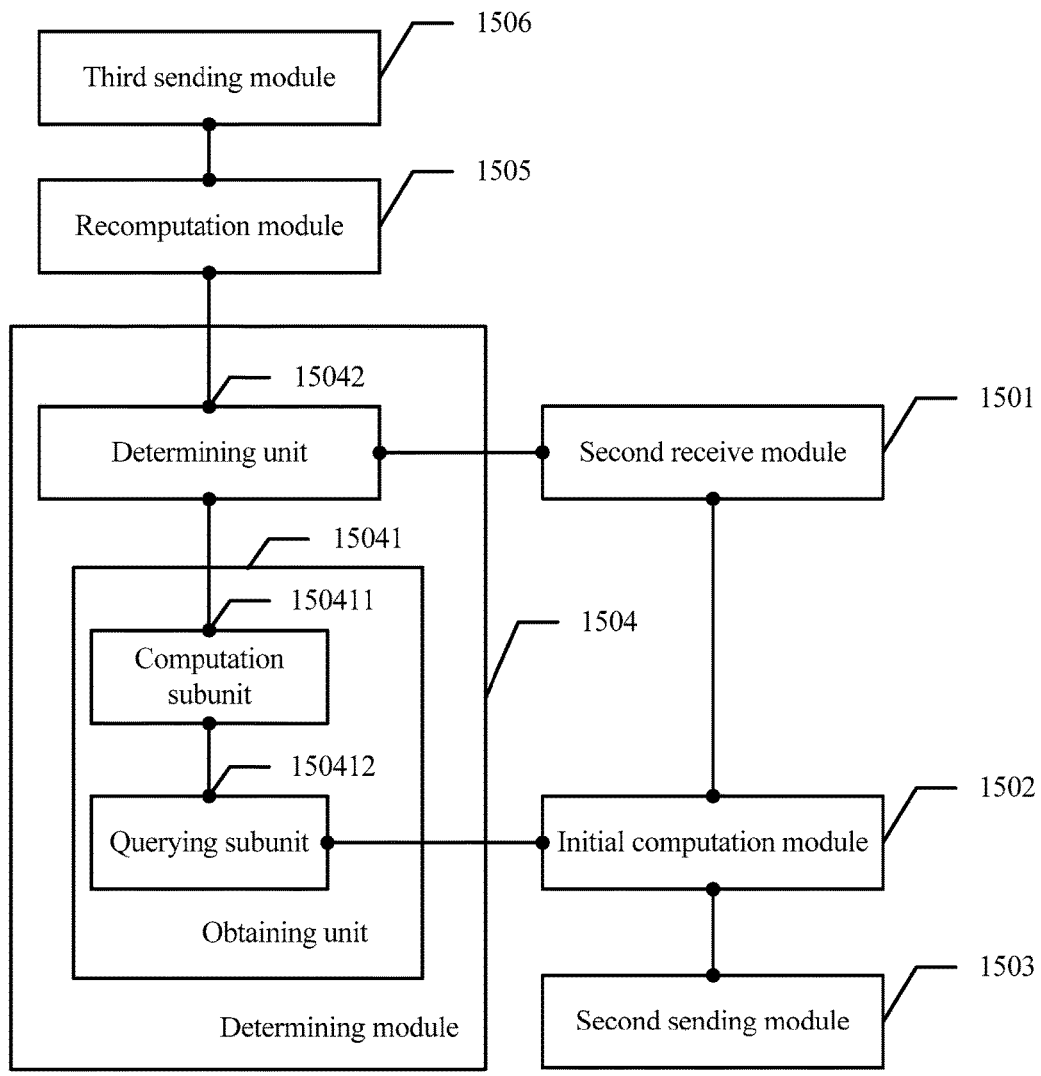
FIG. 15 is another schematic structural diagram of a network device according to an embodiment of the present invention.

In the foregoing embodiment, the obtaining unit 14041 obtains a current network performance parameter change rate on a path meeting a requirement. In actual application, the obtaining unit 14041 may first query a network information database to obtain a network performance parameter on the path meeting the requirement, and then obtain the current network performance parameter change rate by means of computation. Referring to FIG. 15, another embodiment of a network device in the embodiments of the present invention includes:

a second receive module 1501, configured to receive path requirement information and a recomputation condition that are sent by a first network device;

an initial computation module 1502, configured to compute a path meeting a requirement according to the path requirement information received by the second receive module 1501;

a second sending module 1503, configured to send first description information to the first network device, where the first description information is description information of the path that meets the requirement and that is obtained by the initial computation module 1502 by means of computation;

a determining module 1504, configured to determine whether the recomputation condition received by the second receive module 1501 is met;

a recomputation module 1505, configured to perform path recomputation when the determining module 1504 determines that the recomputation condition is met; and a third sending module 1506, configured to send second description information to the first network device, where the second description information is description information of a path obtained by the recomputation module by means of recomputation.

The determining module 1504 specifically includes:

an obtaining unit 15041, configured to obtain a current network performance parameter change rate on the path that meets the requirement and that is obtained by the initial computation module 1502 by means of computation;

a determining unit 15042, configured to: determine whether the current change rate that is of the network performance parameter and that is obtained by the obtaining unit 15041 exceeds a preset network performance parameter change range or whether a preset recomputation time interval is reached; and determine that the recomputation condition is met when it is determined that the preset network performance parameter change range is exceeded or the preset recomputation time interval is reached; or determine that the recomputation condition is not met when it is determined that the preset network performance parameter change range is not exceeded and the preset recomputation time interval is not reached.

In this embodiment, the obtaining unit 15041 specifically includes:

a querying subunit 150411, configured to query a network information database to obtain the network performance parameter on the path meeting the requirement, where the network information database includes status information of a network, the status information includes the network performance parameter, and the status information is stored in the network information database after being measured and collected by a network measurement unit; and a computation subunit 150412, configured to obtain, by means of computation, the current network performance parameter change rate on the path meeting the requirement according to the network performance parameter obtained by the querying subunit 150411 by means of querying.

In this embodiment of the present invention, a querying subunit 150411 queries a network information database to obtain a network performance parameter on a path meeting a requirement, and a computation subunit 150412 obtains a current network performance parameter change rate by means of computation, so that an obtained network performance parameter change rate is more accurate, and accuracy of path recomputation triggering is further improved.

To facilitate understanding of the foregoing embodiment, the following describes a process of interaction between modules in a network device that is configured as a second network device in a specific application scenario.

It is assumed that a first network device is a PCC and a recomputation condition is that a change range of a packet loss/delay is exceeded.

The PCC sends path requirement information to a PCE, where the path requirement information includes requirements on a delay and a packet loss of a path requested to be computed;

a second receive module 1501 receives the path requirement information;

an initial computation module 1502 computes a path according to the path requirement information, and a second sending module 1503 returns first description information to the PCC, where the first description information includes description information of a path that meets a requirement and that is obtained by means of computation;

after receiving the description information of the path meeting the requirement, the PCC sends a recomputation condition to the PCE, which is that the change range of the packet loss/delay is exceeded;

after the second receive module 1501 receives the recomputation condition, a determining module 1504 determines that a change rate (for example, 10%) of a delay/packet loss on the path meeting the requirement exceeds a change range (for example, 15%) of a packet loss/delay in the recomputation condition, and a recomputation module 1505 performs path computation again, and a third sending module 1506 notifies the PCC of a computation result; and the third sending module 1506 sends second description information to the PCC, where the second description information includes description information of a path obtained by means of recomputation.

The foregoing has described the network device configured as the second network device in this embodiment of the present invention from a perspective of a unitized function entity. The following describes the network device configured as the second network device in an embodiment of the present invention from a perspective of hardware processing. Referring to FIG. 12, another embodiment of a network device according to an embodiment of the present invention includes:

an input apparatus 1201, an output apparatus 1202, a processor 1203, and a memory 1204 (a quantity of processors 1203 in a network device may be one or more; in FIG. 12, one processor 1203 is used as an example). In some embodiments of the present invention, the input apparatus 1201, the output apparatus 1202, the processor 1203, and the memory 1204 may be connected by using a bus or by another means. In FIG. 12, a bus connection is used as an example, where:

by invoking an operation instruction stored in the memory 1204, the processor 1203 is configured to perform the following steps:

receive path requirement information and a recomputation condition that are sent by a first network device;

compute a path meeting a requirement according to the path requirement information;

send first description information to the first network device, where the first description information is description information of the path meeting the requirement;

determine whether the recomputation condition is met;

perform path recomputation when the recomputation condition is met; and send second description information to the first network device, where the second description information is description information of a path obtained by means of recomputation.

In some embodiments of the present invention, the processor 1203 specifically performs the following steps:

obtain a current network performance parameter change rate on the path meeting the requirement;

determine whether the current network performance parameter change rate exceeds a preset network performance parameter change range or whether a preset recomputation time interval is reached; and determine that the recomputation condition is met if the preset network performance parameter change range is exceeded or the preset recomputation time interval is reached; or determine that the recomputation condition is not met if the preset network performance parameter change range is not exceeded and the preset recomputation time interval is not reached.

In some embodiments of the present invention, the processor 1203 specifically performs the following steps:

query a network information database to obtain the network performance parameter on the path meeting the requirement, where the network information database includes status information of a network, the status information includes the network performance parameter, and the status information is stored in the network information database after being measured and collected by a network measurement unit; and obtain, by means of computation, the current network performance parameter change rate on the path meeting the requirement according to the network performance parameter.

To enable the first network device to perform corresponding processing according to progress of path computation performed by the second network device, an embodiment of the present invention further provides a message responding method. The following describes the message responding method in this embodiment of the present invention from two perspectives of different entities for executing the method.

Figure 16:
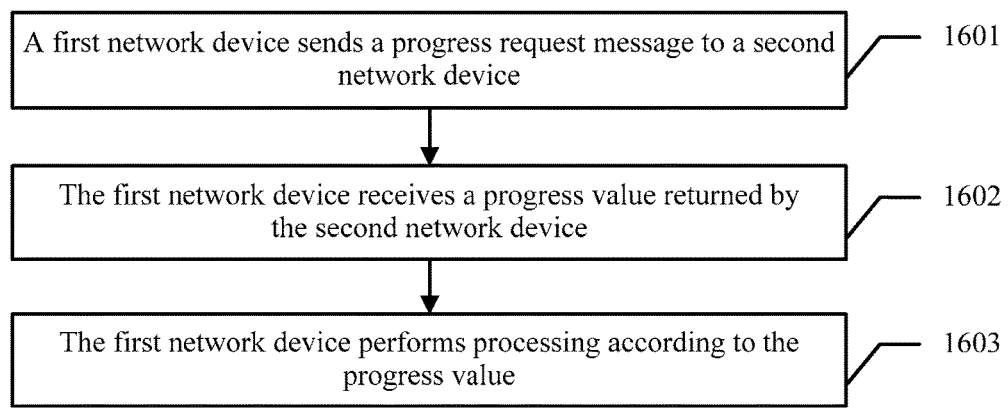
FIG. 16 is a schematic flowchart of a message responding method according to an embodiment of the present invention.

1. Operations of a First Network Device:

Referring to FIG. 16, an embodiment of a message responding method in embodiments of the present invention includes:

1601. A first network device sends a progress request message to a second network device.

When the second network device performs path computation, the first network device sends the progress request message to the second network device, where the progress request message includes a progress request field, and the progress request field is used to request the second network device to report computation progress to the first network device, where the computation progress is progress of performing path computation.

1602. The first network device receives a progress value returned by the second network device.

After sending the progress request message that includes the progress request field to the second network device, the first network device receives the progress value returned by the second network device, where the progress value is used to indicate the computation progress.

1603. The first network device performs processing according to the progress value.

After receiving the progress value, the first network device performs the processing according to the progress value.

In this embodiment of the present invention, a first network device may send a progress request message that includes a progress request field to a second network device, and then the first network device may receive a progress value returned by the second network device and perform the processing according to the progress value, so that the first network device can perform the processing according to computation progress in the second network device, which enhances interaction between devices and improves processing efficiency.

Figure 17:
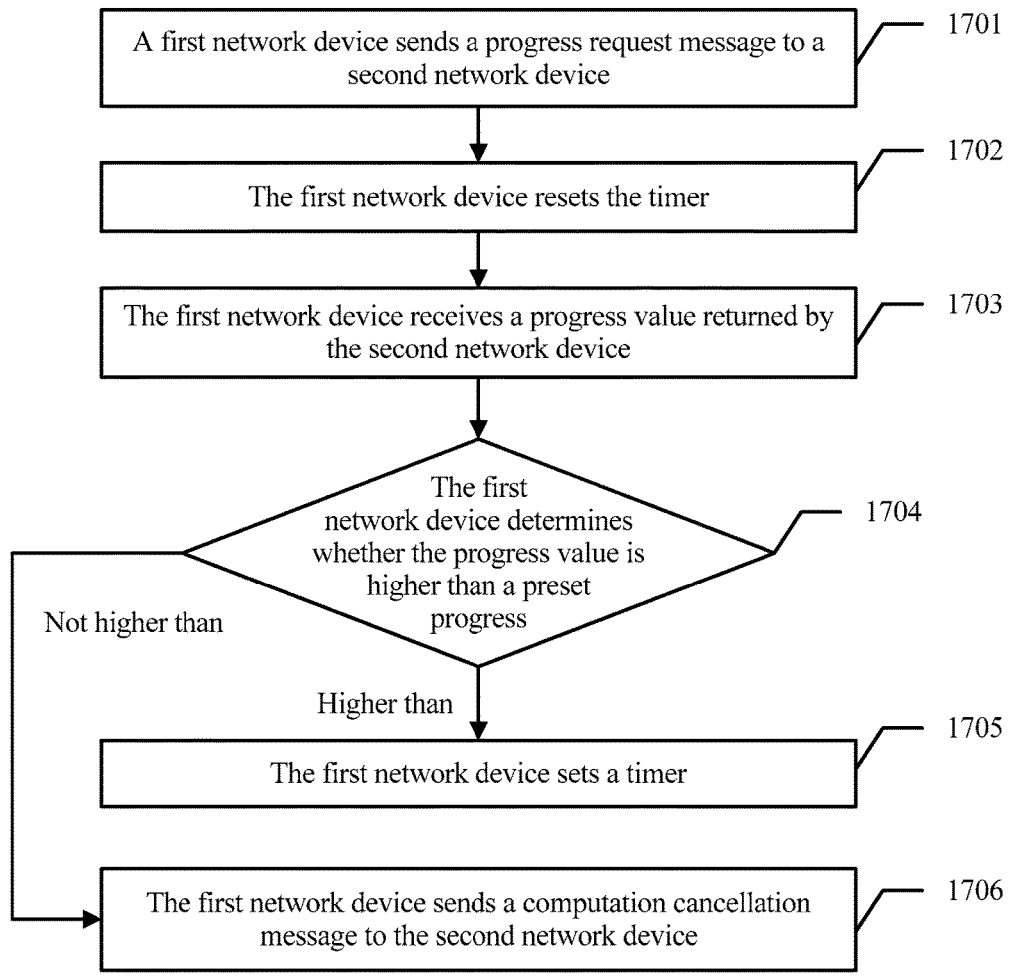
FIG. 17 is another schematic flowchart of a message responding method according to an embodiment of the present invention.

In actual application, the progress request message may further include a time interval field for reporting the progress. The first network device may set a timer according to the time interval field, and then perform subsequent processing. Referring to FIG. 17, another embodiment of a message responding method in the embodiments of the present invention includes:

1701. A first network device sends a progress request message to a second network device.

When the second network device performs path computation, the first network device sends the progress request message to the second network device, where the progress request message includes a progress request field, and the progress request field is used to request the second network device to report computation progress to the first network device, where the computation progress is progress of performing path computation.

1702. The first network device sets a timer.

After sending, to the second network device, the field that includes a time interval for reporting progress, the first network device sets the timer, where when the timer expires, the first network device sends a computation cancellation message to cancel path computation being performed in the second network device; and an expiration value of the timer is not less than a time interval value for reporting progress.

1703. The first network device receives a progress value returned by the second network device.

After sending the progress request message that includes the progress request field to the second network device, the first network device receives the progress value returned by the second network device.

1704. The first network device determines whether the progress value is higher than a preset progress.

After receiving the progress value, the first network device determines whether the progress value is higher than the preset progress.

If the progress value is higher than the preset progress, step 1705 is triggered; or if the progress value is not higher than the preset progress, step 1706 is triggered.

1705. The first network device resets the timer.

When the first network device determines that the progress value is higher than the preset progress, the first network device resets the timer, and the timer restarts timing.

It may be understood that the preset progress may be read from a memory, or may be set in a user-defined manner. No limitation is imposed herein.

1706. The first network device sends a computation cancellation message to the second network device.

When the first network device determines that the progress value is not higher than the preset progress, the first network device sends the computation cancellation message to the second network device, where the computation cancellation message is used to cancel the path computation being performed in the second network device.

It should be noted that when the timer expires, the first network device also sends the computation cancellation message to the second network device to cancel the path computation being performed in the second network device.

It may be understood that the progress request message may further include a report manner field, where the report manner field is used to set a manner in which the second network device reports the computation progress to the first network device, where the manner in which the computation progress is reported may include at least one of reporting completion percentage, reporting remaining completion time, or reporting a quantity of paths that have been computed.

It may be understood that the first network device may be a path computation client PCC, and the second network device may be a path computation element PCE; or the first network device and the second network device may be other network devices that can implement the foregoing steps. No limitation is imposed herein.

The progress request may be included in an existing message, for example, the progress request may be loaded into a path computation request PCReq message; or may be sent alone. No limitation is imposed herein.

In this embodiment of the present invention, a first network device may set a timer; when a progress value is higher than a preset progress, the first network device resets the timer, or when the progress value is not higher than the preset progress, the first network device sends a computation cancellation message to cancel path computation being performed in a second network device. In this way, different operations may be performed more quickly according to different processing progress, which improves path computation efficiency.

Figure 18:
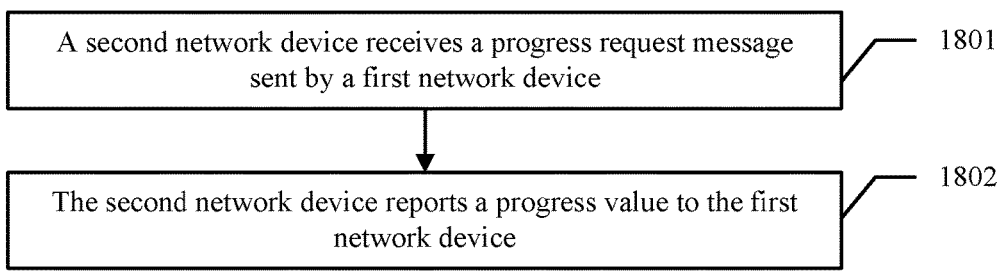
FIG. 18 is another schematic flowchart of a message responding method according to an embodiment of the present invention.

2. Operations of a Second Network Device:

Referring to FIG. 18, another embodiment of a message responding method in embodiments of the present invention includes:

1801. A second network device receives a progress request message sent by a first network device.

The second network device receives the progress request message sent by the first network device, where the progress request message includes a progress request field, and the progress request field is used to request the second network device to report computation progress to the first network device, where the computation progress is progress of performing path computation.

1802. The second network device reports a progress value to the first network device.

After receiving the progress request message that includes the progress request field, the second network device reports the progress value of the path computation to the first network device, where the progress value is used to indicate the computation progress.

It may be understood that the progress request message may further include a time interval field for reporting progress, where the time interval field for reporting the progress includes a time interval value for reporting the progress; after receiving the progress request message that includes the time interval field for reporting the progress, the second network device may report the progress value to the first network device according to the time interval value for reporting the progress.

Further, the progress request message may further include a report manner field, where the report manner field is used to set a manner in which the second network device reports the computation progress to the first network device. After receiving the progress request message that includes the report manner field, the second network device may report the progress value according to a report manner recorded in the report manner field. The manner in which the computation progress is reported may include at least one of reporting completion percentage, reporting remaining completion time, or reporting a quantity of paths that have been computed. No limitation is imposed herein.

It may be understood that the first network device may be a path computation client PCC, and the second network device may be a path computation element PCE; or the first network device and the second network device may be other network devices that can implement the foregoing steps. No limitation is imposed herein.

The progress request message may be included in an existing message, for example, the progress request message may be loaded into a path computation request PCReq message; or may be sent alone. No limitation is imposed herein.

In this embodiment of the present invention, a second network device may report a progress value to a first network device, so that the first network device may perform subsequent processing according to the progress value, which improves path computation efficiency.

To facilitate understanding, the following specifically describes a message responding method in an embodiment of the present invention with reference to operations of two entities for executing the method in a specific application scenario.

Figure 19:
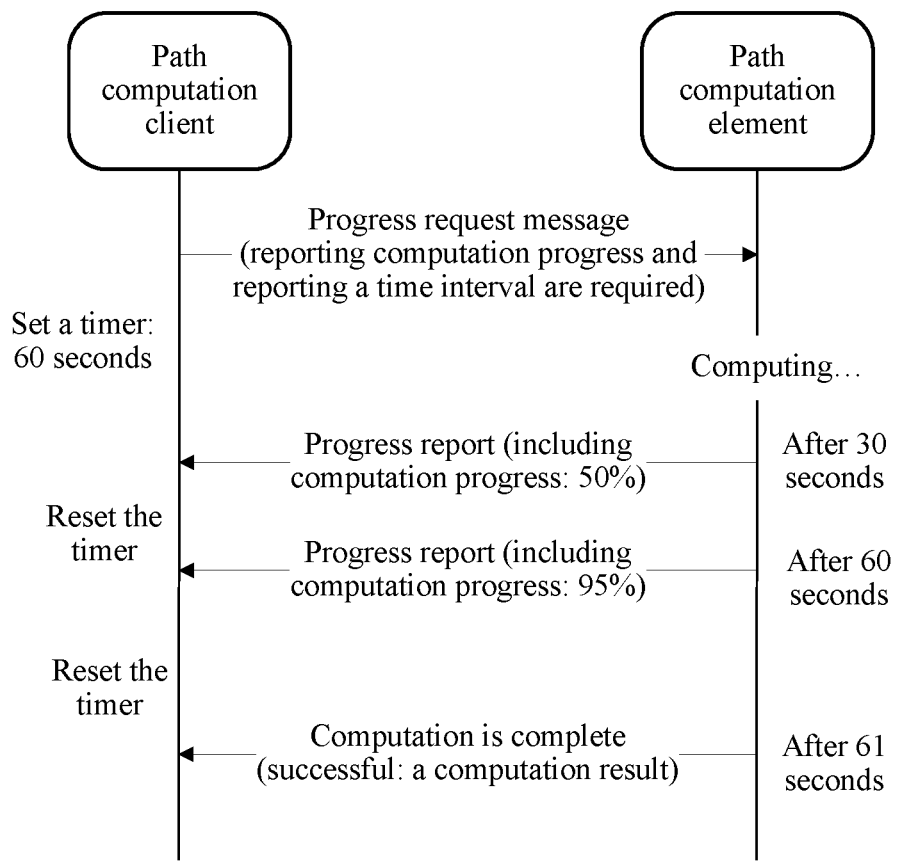
FIG. 19 is a schematic diagram of an example of signaling interaction of a message responding method according to an embodiment of the present invention.

As shown in FIG. 19, when a PCE performs path computation, a PCC sends a progress request message to the PCE, where the progress request message includes a progress request field and a time interval field for reporting progress, so as to request the PCE to report computation progress once every 30 s.

The PCC sets an expiration time of the timer to 60 seconds; and the PCC receives, every 30 seconds, a progress value returned by the PCE.

For example, a progress value returned the first time is 50%. The PCC determines that the progress value 50% is higher than a progress 30% preset the first time, and resets the timer; and a progress value returned the second time is 95%, which is higher than a progress 70% preset the second time, and the timer is reset.

Figure 20:
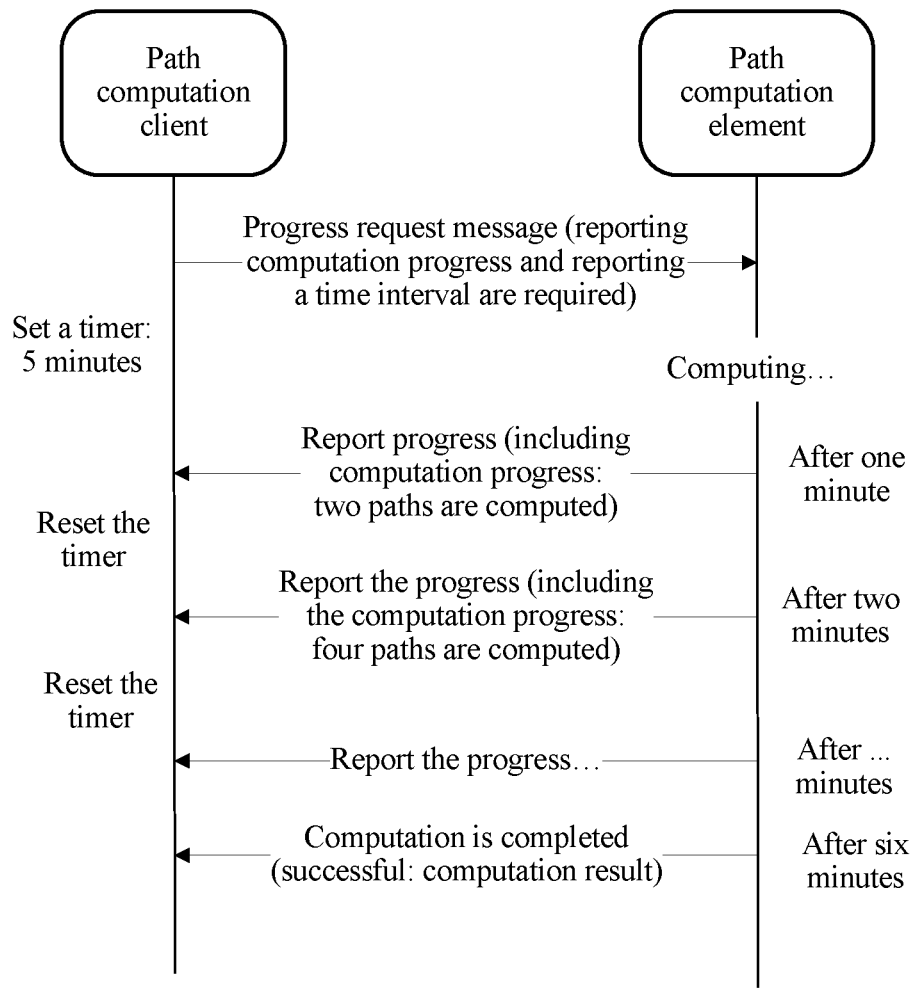
FIG. 20 is a schematic diagram of another example of signaling interaction of a message responding method according to an embodiment of the present invention.

As shown in FIG. 20, the progress request message may further include a report manner field, which is used to set a manner of reporting progress by using a quantity of paths that have been computed;

The PCC sets the expiration time of the timer to 5 minutes; and the PCC receives, every 1 minute, a progress value returned by the PCE.

For example, a progress value returned the first time is 2, which is higher than progress 1 preset the first time, and the timer is reset; a progress value returned the second time is 4, which is higher than progress 3 preset the second time, and the timer is reset. Determining is performed cyclically until path computation is complete.

Figure 21:
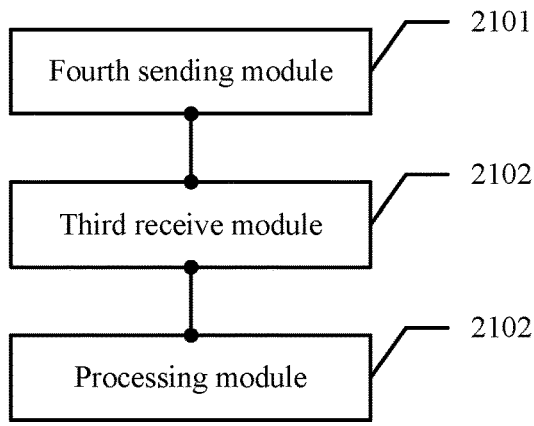
FIG. 21 is another schematic structural diagram of a network device according to an embodiment of the present invention.

The following describes a network device that is configured as a first network device and that is used for message responding in an embodiment of the present invention. Referring to FIG. 21, another embodiment of a network device in the embodiments of the present invention includes:

a fourth sending module 2101, configured to send a progress request message to a second network device, where the progress request message includes a progress request field, and the progress request field is used to request the second network device to report computation progress to the first network device, where the computation progress is progress of performing path computation;

a third receive module 2102, configured to receive a progress value returned by the second network device, where the progress value is used to indicate the computation progress; and a processing module 2103, configured to perform processing according to the progress value received by the third receive module 2102.

In this embodiment of the present invention, a fourth sending module 2101 may send a progress request message that includes a progress request field to a second network device, then the third receive module 2102 may receive a progress value returned by the second network device, and then the processing module 2103 performs the processing according to the progress value, so that the first network device can perform the processing according to computation progress in the second network device, which enhances interaction between devices and improves processing efficiency.

Figure 22:
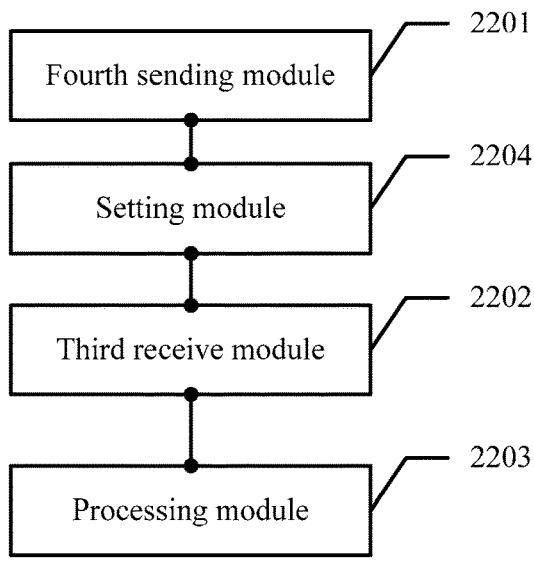
FIG. 22 is another schematic structural diagram of a network device according to an embodiment of the present invention.

In actual application, the progress request message may further include a time interval field for reporting progress. The first network device may set a timer according to the time interval field. Referring to FIG. 22, another embodiment of a network device in the embodiments of the present invention includes:

a fourth sending module 2201, configured to send a progress request message to a second network device, where the progress request message includes a progress request field, and the progress request field is used to request the second network device to report computation progress to the first network device, where the computation progress is progress of performing path computation;

a third receive module 2202, configured to receive a progress value returned by the second network device, where the progress value is used to indicate the computation progress; and a processing module 2203, configured to perform processing according to the progress value received by the third receive module 2202.

In this embodiment, the network device further includes:

a setting module 2204, configured to set a timer, where an expiration value of the timer is not less than a value of a time interval for reporting progress.

The processing module 2203 may be specifically configured to: determine whether the progress value received by the third receive module 2202 is higher than a preset progress; and reset the timer when it is determined that the progress value is higher than the preset progress; or send a computation cancellation message to the second network device when it is determined that the progress value received by the third receive module 2202 is not higher than the preset progress, where the computation cancellation message is used to cancel path computation being performed in the second network device.

In this embodiment of the present invention, a setting module 2204 may set a timer. When a progress value is higher than a preset progress, the processing module 2203 resets the timer, or when the progress value is not higher than the preset progress, the processing module 2203 sends a computation cancellation message to cancel path computation being performed in a second network device. In this way, different operations may be performed more quickly according to different processing progress, which improves path computation efficiency.

The foregoing has described the network device configured as the first network device in this embodiment of the present invention from a perspective of a unitized function entity. The following describes the network device configured as the second network device in this embodiment of the present invention from a perspective of hardware processing. Referring to FIG. 12, another embodiment of a network device in the embodiments of the present invention includes:

an input apparatus 1201, an output apparatus 1202, a processor 1203, and a memory 1204 (a quantity of processors 1203 in a network device may be one or more; in FIG. 12, one processor 1203 is used as an example). In some embodiments of the present invention, the input apparatus 1201, the output apparatus 1202, the processor 1203, and the memory 1204 may be connected by using a bus or by another means. In FIG. 12, a bus connection is used as an example, where:

by invoking an operation instruction stored in the memory 1204, the processor 1203 is configured to perform the following steps:

send a progress request message to a second network device, where the progress request message includes a progress request field, and the progress request field is used to request the second network device to report computation progress to the first network device, where the computation progress is progress of performing path computation;

receive a progress value returned by the second network device, where the progress value is used to indicate the computation progress; and perform processing according to the received progress value.

In some embodiments of the present invention, the progress request message may further include a time interval field for reporting progress, where the time interval field for reporting the progress includes a time interval value for reporting the progress. The processor 1203 is further configured to perform the following steps:

set a timer, where an expiration value of the timer is not less than the time interval value for reporting the progress.

In some embodiments of the present invention, the processor 1203 is specifically configured to perform the following steps:

determine whether the progress value is higher than a preset progress;

reset the timer when the progress value is higher than a preset progress; and send a computation cancellation message to the second network device when the progress value is not higher than a preset progress, where the computation cancellation message is used to cancel path computation being performed in the second network device.

Figure 23:
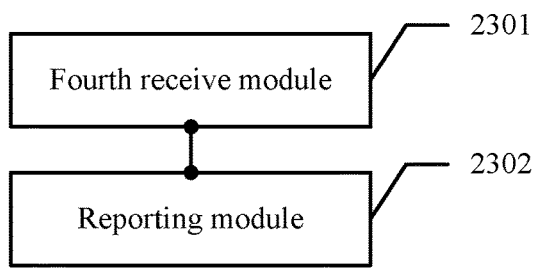
FIG. 23 is another schematic structural diagram of a network device according to an embodiment of the present invention.

The following describes a network device that is configured as a second network device and that is used for message responding in an embodiment of the present invention. Referring to FIG. 23, another embodiment of a network device in the embodiments of the present invention includes:

a fourth receive module 2301, configured to receive a progress request message sent by a first network device, where the progress request message includes a progress request field, and the progress request field is used to request the second network device to report computation progress to the first network device, where the computation progress is progress of reporting path computation; and a reporting module 2302, configured to report a progress value to the first network device, where the progress value is used to indicate the computation progress.

In this embodiment, the progress request message further includes a time interval field for reporting progress, where the time interval field for reporting the progress includes a time interval value for reporting the progress; and in this case, the reporting module 2302 is specifically configured to report the progress value to the first network device according to the time interval value for reporting the progress.

The progress request message may further include a report manner field, where the report manner field is used to set a manner in which the second network device reports the computation progress to the first network device; and in this case, the reporting module 2302 is specifically configured to report the computation progress value to the first network device according to the manner of reporting the computation progress and the time interval value for reporting the progress.

In this embodiment of the present invention, a reporting module 2302 may report a progress value to a first network device, so that the first network device may perform subsequent processing according to the progress value, which improves path computation efficiency.

The foregoing has described the network device configured as the second network device in this embodiment of the present invention from a perspective of a unitized function entity. The following describes the network device configured as the second network device in this embodiment of the present invention from a perspective of hardware processing. Referring to FIG. 12, another embodiment of a network device according to an embodiment of the present invention includes:

an input apparatus 1201, an output apparatus 1202, a processor 1203, and a memory 1204 (a quantity of processors 1203 in a network device may be one or more; in FIG. 12, one processor 1203 is used as an example). In some embodiments of the present invention, the input apparatus 1201, the output apparatus 1202, the processor 1203, and the memory 1204 may be connected by using a bus or by another means. In FIG. 12, a bus connection is used as an example, where:

by invoking an operation instruction stored in the memory 1204, the processor 1203 is configured to perform the following steps:

receive a progress request message sent by a first network device, where the progress request message includes a progress request field, and the progress request field is used to request a second network device to report computation progress to the first network device, where the computation progress is progress of performing path computation; and report a progress value returned to the first network device, where the progress value is used to indicate the computation progress.

In some embodiments of the present invention, the progress request message may further include a time interval field for reporting progress, where the time interval field for reporting the progress includes a time interval value for reporting the progress; the processor 1203 is specifically configured to perform the following steps:

report the progress value to the first network device according to the time interval value for reporting the progress.

In some embodiments of the present invention, the progress request message further includes a report manner field, where the report manner field is used to set a manner in which the second network device reports the computation progress to the first network device; the processor 1203 is specifically configured to perform the following steps:

report the computation progress value to the first network device according to the manner of reporting the computation progress and the time interval value for reporting the progress.

It may be understood that, in actual application, the foregoing path computation method and the foregoing message responding method may be combined in an embodiment: A first network device may send both a recomputation condition and a progress request message to a second network device, so that the second network device may perform path recomputation according to the recomputation condition, and report progress of performing the path recomputation to the first network device in a manner represented by each field in the progress request message; these two methods may be used independently. No limitation is imposed herein.

The following describes a path computation system in an embodiment of the present invention. An embodiment of the path computation system in the embodiments of the present invention includes:

a network device configured as a first network device shown in an embodiment corresponding to any one of FIG. 10 to FIG. 12, and a network device configured as a second network device shown in an embodiment corresponding to any one of FIG. 13 to FIG. 15.

Another embodiment of a path computation system in the embodiments of the present invention includes:

a network device configured as a first network device shown in an embodiment corresponding to FIG. 21 or FIG. 22, and a network device configured as a second network device shown in an embodiment corresponding to FIG. 23.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located at one position, or may be distributed on a plurality of network units. Some or all of the units may be selected according to actual needs to achieve the objectives of the solutions of the embodiments.

In addition, function units in the embodiments of the present invention may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or configured as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The computer software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A path computation method, comprising:
receiving, by a second network device, path requirement information and a recomputation condition that are sent by a first network device, wherein the path requirement information comprises a required network performance parameter, and the network performance parameter comprises at least one of a delay, a packet loss, jitter, and bandwidth, and wherein the recomputation condition is related with network performance parameter change rate;

computing, by the second network device, a path meeting a requirement according to the path requirement information;

sending, by the second network device, first description information to the first network device, wherein the first description information is description information of the path meeting the requirement;

determining, by the second network device, whether the recomputation condition is met;

performing, by the second network device, path recomputation when the recomputation condition is met; and sending, by the second network device, second description information to the first network device, wherein the second description information is description information of a path obtained by means of recomputation.

2. The method according to claim 1, wherein the determining, by the second network device, whether the recomputation condition is met comprises:

obtaining, by the second network device, a current network performance parameter change rate on the path meeting the requirement;

determining, by the second network device, whether a preset recomputation time interval is reached or whether the current network performance parameter change rate exceeds a preset network performance parameter change range; and determining that the recomputation condition is met if the preset recomputation time interval is reached or the preset network performance parameter change range is exceeded; or determining that the recomputation condition is not met if the preset recomputation time interval is not reached and the preset network performance parameter change range is not exceeded.

3. The method according to claim 2, wherein the obtaining, by the second network device, a current network performance parameter change rate on the path meeting the requirement specifically comprises:

querying, by the second network device, a network information database to obtain a network performance parameter on the path meeting the requirement, wherein the network information database comprises status information of a network, the status information comprises the network performance parameter, and the status information is stored in the network information database after being measured and collected by a network measurement unit; and obtaining, by the second network device by means of computation, the current network performance parameter change rate on the path meeting the requirement according to the network performance parameter.

4. The method according to claim 1, wherein both the first network device and the second network device are located on an overlay network.

5. The method according to claim 4, wherein:
the first network device is a path computation client PCC; and
the second network device is a path computation element PCE.

6. The method according to claim 1, wherein, the method further comprises:

receiving, by the second network device, a progress request message sent by the first network device, wherein the progress request message comprises a progress request field, and the progress request field is used to request the second network device to report computation progress to the first network device, wherein the computation progress is progress of performing path computation; and reporting, by the second network device, a progress value to the first network device, wherein the progress value is used to indicate the computation progress.

7. The method according to claim 6, wherein the progress request message further comprises a time interval field for reporting progress and a report manner field, wherein the time interval field for reporting the progress comprises a time interval value for reporting the progress, and the report manner field is used to set a manner in which the second network device reports the computation progress to the first network device; and the reporting, by the second network device, a progress value to the first network device comprises:

reporting, by the second network device, the progress value to the first network device according to the manner in which the computation progress is reported and the time interval value for reporting the progress.

8. A network device, wherein the network device is a first network device and comprises:

a processor; and a non-transitory computer readable medium which contains computer-executable instructions, the processor is configured to execute the computer-executable instructions to perform operations comprising:

sending path requirement information and a recomputation condition to a second network device, wherein the path requirement information comprises a required network performance parameter, and the network performance parameter comprises at least one of a delay, a packet loss, jitter, and bandwidth, and wherein the recomputation condition is related with network performance parameter change rate, and wherein: the path requirement information is used to enable the second network device to obtain, by means of computation, a path meeting a requirement and return first description information, wherein the first description information is description information of the path meeting the requirement; and the recomputation condition is used to enable the second network device to perform path recomputation and return second description information when the recomputation condition is met, wherein the second description information is description information of a path obtained by means of recomputation; and receiving the first description information and the second description information that are returned by the second network device.

9. The network device according to claim 8, wherein the processor is further configured to execute the computer-executable instructions to perform operations comprising:

sending a progress request message to a second network device, wherein the progress request message comprises a progress request field, and the progress request field is used to request the second network device to report computation progress to the first network device, wherein the computation progress is progress of performing path computation; and receiving a progress value returned by the second network device, wherein the progress value is used to indicate the computation progress; and performing processing according to the progress value.

10. The network device according to claim 9, wherein when the progress request message further comprises a time interval field for reporting progress, and the time interval field for reporting the progress comprises a time interval value for reporting the progress, the processor is further configured to execute the computer-executable instructions to perform operations comprising:

setting a timer, wherein an expiration value of the timer is not less than the time interval value for reporting the progress; and determining whether the progress value is higher than a preset progress; and reset the timer when it is determined that the progress value is higher than the preset progress; or send a computation cancellation message to the second network device when it is determined that the progress value is not higher than the preset progress, wherein the computation cancellation message is used to cancel path computation being performed in the second network device.

11. A network device, wherein the network device is a second network device and comprises:

a processor; and a non-transitory computer readable medium which contains computer-executable instructions, the processor is configured to execute the computer-executable instructions to perform operations comprising:

receiving path requirement information and a recomputation condition that are sent by a first network device, wherein the path requirement information comprises a required network performance parameter, and the network performance parameter comprises at least one of a delay, a packet loss, jitter, and bandwidth, and wherein the recomputation condition is related with network performance parameter change rate;

computing a path meeting a requirement according to the path requirement information;

sending first description information to the first network device, wherein the first description information is description information of the path that meets the requirement and that is obtained by means of computation;

determining whether the recomputation condition is met;

performing path recomputation when determining that the recomputation condition is met; and sending second description information to the first network device, wherein the second description information is description information of a path obtained by means of recomputation.

12. The network device according to claim 11, wherein the operation of determining comprises:

obtaining a current network performance parameter change rate on the path that meets the requirement and that is obtained by means of computation;

determining whether a preset recomputation time interval is reached or whether the current change rate that is of the network performance parameter and that is obtained by the obtaining unit exceeds a preset network performance parameter change range; and determine that the recomputation condition is met when it is determined that the preset recomputation time interval is reached or the preset network performance parameter change range is exceeded; or determine that the recomputation condition is not met when it is determined that the preset recomputation time interval is not reached and the preset network performance parameter change range is not exceeded.

13. The network device according to claim 12, wherein the operation of obtaining comprises:

querying a network information database to obtain the network performance parameter on the path meeting the requirement, wherein the network information database comprises status information of a network, the status information comprises the network performance parameter, and the status information is stored in the network information database after being measured and collected by a network measurement unit; and obtaining, by means of computation, the current network performance parameter change rate on the path meeting the requirement according to the network performance parameter obtained by the querying subunit by means of querying.

14. The network device according to claim 11, wherein the processor is further configured to execute the computer-executable instructions to perform operations comprising:

receiving a progress request message sent by a first network device, wherein the progress request message comprises a progress request field, and the progress request field is used to request the second network device to report computation progress to the first network device, wherein the computation progress is progress of performing path computation; and reporting a progress value to the first network device, wherein the progress value is used to indicate the computation progress.

15. The network device according to claim 14, wherein when the progress request message further comprises a time interval field for reporting progress and a report manner field, wherein the time interval field for reporting the progress comprises a time interval value for reporting the progress, and the report manner field is used to set a manner in which the second network device reports the computation progress to the first network device, wherein the operation of reporting comprises: reporting the computation progress value to the first network device according to the manner of reporting the computation progress and the time interval value for reporting the progress.

* * * * *